United States Patent
Mark et al.

(10) Patent No.: US 7,181,221 B1
(45) Date of Patent: Feb. 20, 2007

(54) CELLULAR NETWORK HANDOFF MODELING

(75) Inventors: Brian L. Mark, Fairfax, VA (US); Alexe E. Leu, Arlington, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 503 days.

(21) Appl. No.: 10/670,467

(22) Filed: Sep. 26, 2003

Related U.S. Application Data

(60) Provisional application No. 60/413,449, filed on Sep. 26, 2002.

(51) Int. Cl.
*H04Q 7/20* (2006.01)

(52) U.S. Cl. .................. 455/436; 455/443; 370/331

(58) Field of Classification Search ........ 455/436–444; 370/331–334
See application file for complete search history.

(56) References Cited

U.S. PATENT DOCUMENTS

| | | | |
|---|---|---|---|
| 6,597,673 B1 * | 7/2003 | Nobuyasu et al. | 340/331 |
| 6,711,408 B1 * | 3/2004 | Raith | 455/440 |
| 2005/0048978 A1 * | 3/2005 | Santhoff et al. | 455/442 |
| 2005/0079878 A1 * | 4/2005 | Smith et al. | 455/456.5 |

* cited by examiner

Primary Examiner—Edward F. Urban
Assistant Examiner—Blane J. Jackson
(74) Attorney, Agent, or Firm—David G. Grossman; David Yee

(57) ABSTRACT

Disclosed is a system for evaluating the performance of cellular network handoff decisions. One embodiment of this system includes the steps of: creating a reference cellular network description; creating reduced geometric structures from the reference cellular network description; representing a general trajectory for a mobile unit in the reference cellular network description; approximating the general trajectory with a piecewise path having a multitude of handoff decision points; selecting a handoff mechanism; selecting handoff parameters; creating a discrete-time formulation characterizing handoff behaviors; and calculating at least one handoff performance metric. The handoff performance metrics may include assignment probabilities; handoff probabilities; a mean number of handoff value; a crossover point; and overall signaling load incurred by a handoff mechanism.

24 Claims, 28 Drawing Sheets

CELLULAR NETWORK HANDOFF MODELING

CROSS-REFERENCE TO RELATED APPLICATIONS

The present application claims the benefit of provisional patent application: Ser. No. 60/413,449 to Mark et al., filed on Sep. 26, 2002, entitled "Cellular Network Handoffs," which is hereby incorporated by reference.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Grant No. AC10133390, awarded by the National Science Foundation.

BACKGROUND OF THE INVENTION

The present invention relates to the field of cellular network systems. In particular, the present invention provides for efficient modeling and analysis of cellular handoff decision mechanisms used in cellular networks.

In cellular networks, each mobile station (MS) maintains connectivity via an active set of base stations (BS). A handoff algorithm determines the dynamics of the active set as the MS moves through the network. In hard handoff, the MS is "handed off" from one BS to another BS as it leaves the cell coverage area of the first BS and enters that of the second BS. In this case, the active set of an MS consists of at most one BS at any given time. Hard handoff algorithms are used in the GSM (Global System for Mobile Communications) and GPRS wireless networking standards and are still under active investigation for use in High Data Rate (HDR) services.

Wireless technologies based on CDMA generally employ soft handoff, whereby the MS maintains an active set that may contain multiple BSs. A soft handoff occurs whenever a BS enters or leaves the active set of an MS. Soft handoff algorithms are used in the IS-95 and cdma2000 standards and have been proposed for use in the WCDMA standard.

The handoff behavior of mobile units in a cellular network may be critical to the overall performance of the network in terms of quality-of-service, resource utilization, and signaling load. Ideally, the network should maintain seamless quality-of-service for an active mobile user engaged in a call as it traverses cell boundaries. Even when the mobile station is in the idle state, the choice of cell assignment set may impact the network in terms of resource utilization and signaling load, as well as the quality-of-service experienced by the MS when it transits to the active state. Thus, the proper design and dimensioning of the handoff algorithm may be crucial to the deployment of a cellular network.

What is needed is a discrete-time framework for analyzing the performance of handoff algorithms executed by an MS based on pilot signal strength measurements from candidate BSs.

Vijayan and Holtzman were among the first to propose an analytical model for handoff based on signal strength measurements. (See R. Vijayan and J. M. Holtzman, "A Model for Analyzing Handoff Algorithms," IEEE Trans. on Vehicular Technology, vol. 42, pp. 351–356, August 1993.) They modeled the trajectory of a mobile station as a continuous-time process wherein handoffs corresponded to the level-crossing events of the relative signal strength between two candidate base stations. They further argued that the level-crossing events could be modeled approximately by Poisson processes with time-varying rate functions. A limitation of the Poisson level-crossing model is that it is accurate only for relatively high level-crossings. Furthermore, when the model is applied to the realistic scenario of sampled signal measurements, the sampling interval must be sufficiently small for the model assumptions to hold. Another limitation of this model is that it is applicable only to relative signal strength measurements and may not accommodate constraints on absolute signal strength.

Subsequently, Zhang and Holtzman proposed an alternative approach to analyzing handoff based on the Gaussian properties of the sampled and processed received signal strengths. (See N. Zhang and J. M. Holtzman, "Analysis of Handoff Algorithms Using Both Absolute and Relative Measurements," IEEE Trans. on Vehicular Technology, vol. 45, pp. 174–179, February 1996.) Their approach incorporated absolute signal strength thresholds in the handoff algorithm. Approximations for the handoff probabilities are obtained by making some simplifying assumptions. However, one skilled in the art will observe that the approximate formulas disclosed in this article may be inaccurate, particularly when relative signal strength alone is used as the basis for handoff. What is needed is a handoff model that can utilize an exact discrete-time model based on the Gaussian properties of received signal strengths.

In many papers related to handoff analysis, the MS trajectory under consideration is limited to the straight line directly connecting the two candidate base stations involved in the handoff. However, handoff behavior may depend strongly on the trajectory followed by the MS. For arbitrary MS trajectories, simulation-based methods have been the only alternative for obtaining accurate performance measures. What is also needed is a system that can utilize a representation of a general trajectory in a cellular network capable of yielding a concise characterization of handoff performance over a wide range of MS trajectories in the network.

Early work on handoff analysis has largely been based on computer simulation studies. In industrial practice, computer simulation remains the primary means for choosing key parameters to optimize the performance of modern-day wireless networks. Detailed computer simulations of wireless cellular networks require considerable computation time, making them cumbersome to use for the purposes of network design and dimensioning.

What is needed is a system capable of modeling the efficiency of handoff mechanisms in various cellular networks.

BRIEF SUMMARY OF THE INVENTION

One advantage of the present invention is that it provides a discrete-time formulation for handoff problem(s).

Another advantage of this invention is that it characterizes the handoff behavior of a given mobile station in terms of cell assignment events associated with a discrete-time random process determined by the averaged measurements of signal strengths received from base stations.

Another advantage of this invention is that it provides an efficient numerical procedure to compute the handoff performance measures.

Yet a further advantage of this invention is that it uses an exact discrete-time model based on the Gaussian properties of received signal strengths.

To achieve the foregoing and other advantages, in accordance with the invention as embodied and broadly described herein, the present invention includes a discrete-time framework for analyzing the performance of handoff algorithms executed by an MS based on pilot signal strength measurements from candidate BSs.

In yet a further aspect of the invention, the handoff mechanisms may be primarily hard handoff mechanisms, which may be applicable to networks based on the GSM and GPRS standards.

In yet a further aspect of the invention, the handoff mechanisms may be primarily soft handoff mechanisms, which may be applicable to networking standards such as IS-95 and cdma2000.

In yet a further aspect of the invention, the handoff mechanisms may be both hard and soft handoff mechanisms.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

The handoff mechanism employed in a cellular network may have a significant impact on overall network performance. Evaluation of handoff mechanism performance has for the most part been carried out using brute-force computer simulation or simplified approximations. The present invention utilizes a new discrete-time framework for evaluating the performance of handoff mechanisms such as hard handoff algorithms based on pilot signal strength measurements. Analytical expressions and associated numerical procedures for evaluating the cell assignment and handoff probabilities of a mobile station moving along a linear trajectory are disclosed. By approximating an arbitrary trajectory with a piecewise linear path, a complete characterization of the overall handoff performance of a cellular network under a given set of parameters may be obtained. This invention provides an accurate and efficient means for the design and dimensioning of high performance handoff algorithms.

The starting point of the present invention is a discrete-time formulation of the handoff problem. The formulation characterizes the handoff behavior of a given mobile station in terms of cell assignment events associated with a discrete-time random process determined by the averaged measurements of signal strengths received from base stations. From the formulation, expressions may be derived for the cell assignment and handoff probabilities at each sampling epoch along a trajectory traversed by the MS. In the present best mode of the invention, the trajectory is an arbitrary straight-line trajectory. However, one skilled in the art will recognize that other trajectories may be utilized. A numerical procedure may then be developed to compute handoff performance measures.

To characterize handoff performance for arbitrary trajectories in a cellular network, a general path may be approximated by a piecewise linear path within a reduced geometric structure derived from the cellular network geometry. A concise characterization of the mean number of handoffs over a wide range of mobile trajectories in the network may then be obtained. This characterization preferably provides a measure of the overall signaling load incurred by the handoff algorithm.

A basic signal propagation system model for a general class of handoff algorithms will be discussed. This discussion will first focus on a familiar continuous-time setting and then on a discrete-time setting, providing the basis for subsequent discussion. The signal propagation model is primarily for the pilot signal strength used by handoff algorithms. The propagation model preferably provides the basis for analyzing the handoff performance of an MS traveling along a straight-line trajectory at constant speed in a cellular network. A discrete-time version of this model may be used in subsequent analysis of handoff performance.

Figure 1:
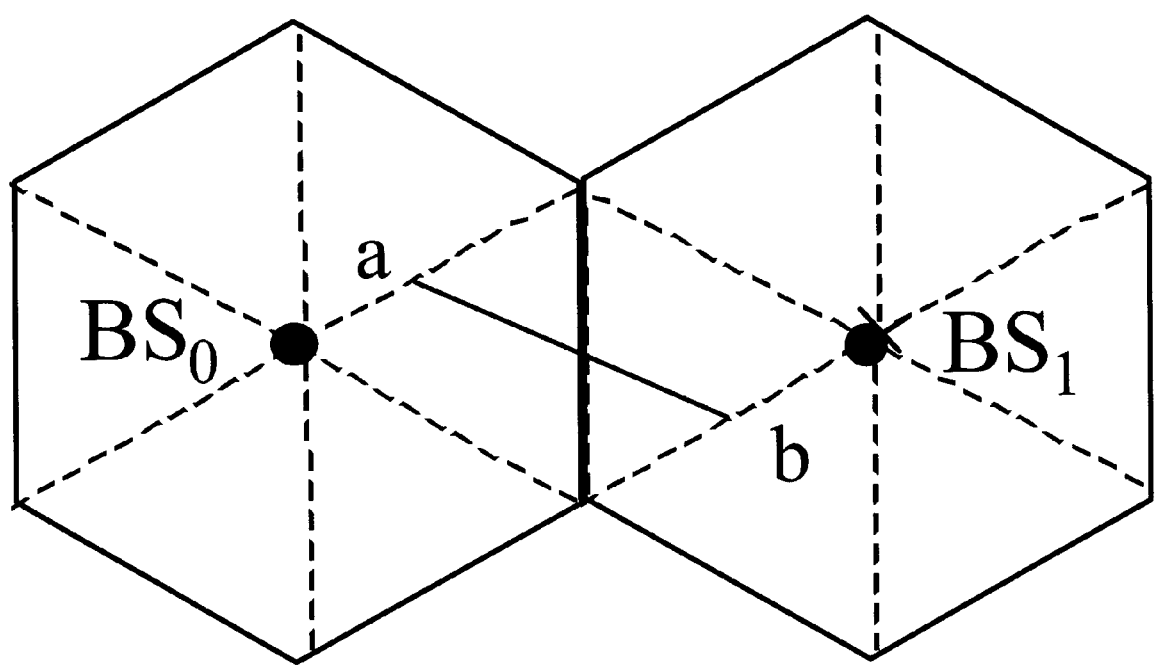
FIG. 1 is a diagram showing a straight-line trajectory between two base stations in a cellular network.

The cellular network consists of a set of base stations. The $i^{th}$ base station, $BS_i$, located by a position vector $b_i$, lies approximately at the center of its associated cell i. The coverage area of cell i may be determined by the pilot signal strength from $BS_i$. Assuming that the MS is initially located at position a at time 0 and connected to $BS_i$, the MS may reach position b at time T, moving at a constant speed of v along the line segment between a and b. As the MS moves along this trajectory, the candidate BS for handoff as shown in FIG. 1 is $BS_j$. The MS may make handoff decisions based on measurements of the pilot signal strengths received from the two base stations $BS_i$ and $BS_j$. The position, r(t), of the mobile user at time t may be given as follows:

$$r(t)=a+vte; 0 \leq t \leq T, $$

where e is the unit vector in the direction of the vector b−a.

The pilot signal strength (in dB) received from a BS as a function of distance in typical urban mobile environments may be modeled empirically as the sum of three components: path loss, shadow fading, and fast fading. The path loss may be a deterministic function of the distance d from the BS, while the shadow and fast fading components may be modeled as random processes. This model has been used in a number of studies of handoff performance in cellular networks. Under the assumption of constant MS speed along the straight-line trajectory, the pilot signal strength may be equivalently expressed as a function of a continuous-time parameter t.

We will now describe a continuous-time model. The pilot signal strength (in dB), received at the mobile from $BS_i$ at time t may be represented as follows:

$$Y_i(t)=m_i(t)+W_i(t)+Z_i(t); t \geq 0, \quad (1)$$

where $$m_i(t)=v_i-u_i \log(\|r(t)-b_i(t)\|), \quad (2)$$

and $\{W_i(t)\}, i \in C$ are independent, zero mean stationary Gaussian processes. The term $m_i(t)$ accounts for path loss, while $W_i(t)$ models the effect of lognormal (shadow) fading and $Z_i(t)$ models fast fading. The autocorrelation function of $W_i(t)$ has been experimentally observed to have the form:

$$Rw_i(\tau) = \sigma^2 w_i \exp\left(-\frac{v|\tau|}{d_0}\right), \quad (3)$$

where $\sigma w_i$ is the standard deviation of the shadowing signal strength and the constant do is called the decay factor.

To eliminate the effect of fast fading, the MS applies an exponential averaging window to the measured signal strength $Y_i(t)$. The impulse response of the averaging window may be given by $$f_{av}(t) = \frac{1}{d_{av}} \exp\left(-\frac{vt}{d_{av}}\right), t \geq 0, \quad (4)$$

where $d_{av}$ determines the effective size of the averaging window. The processed pilot signal strength from base station $BS_i$ may then given by $$X_i(t)=f_{av}(t)*Y_i(t); t \geq 0, \quad (5)$$

where * denotes the standard convolution operation.

Handoff performance based on a discrete-time model for the signal strength measurements will now be discussed. In the discrete-time model, the mobile unit may sample the pilot signal strengths at time instants $t_k=kt_s$, where $t_s$ is the sampling interval. The distance between successive sampling positions of the mobile may be denoted by $d_s=vt_s$. The discrete-time model may capture the handoff behavior of an MS more accurately than its continuous-time counterpart since all signal strength measurements are sampled.

In discrete time, the basic signals of the system model may simply be sampled versions of their continuous-time counterparts:

$$Y_i[k]=Y_i(t_k); m_i[k]=m_i(t_k); W_i[k]=W_i(t_k); k>0, \quad (6)$$

The processes $\{W_i[k]\}$, $i \in C$, are independent, zero-mean, stationary Gaussian processes characterized by an autocorrelation function which may be given by:

$$Rw_i(m) = \sigma^2 w_i \exp\left(\frac{-|m|d_s}{d_0}\right), \quad (7)$$

One skilled in the art will recognize that the cross-correlation between received signal strengths may easily be incorporated into this model.

The shadow fading process $\{W_i[k]\}$ cyan be represented as a first order autoregressive (AR) process by the following difference equation:

$$W_i[k]=aW_i[k-1]+V_i[k]; k \geq 0, \quad (8)$$

where $\{V_i[k]\}$ is a zero mean, stationary white Gaussian noise process with variance $\sigma_{v_i}^2$. The parameters, $(a, \sigma_{v_i}^2)$, of the AR model preferably determine an autocorrelation function for $\{W_i[k]\}$ of the form $$Rw_i(m) = \sigma_{v_i}^2 \frac{a^{|m|}}{1-a^2} \quad (9)$$

By comparing (9) and (7), the AR parameters for shadow fading may be determined as follows:

$$a = \exp\left(-\frac{d_s}{d_0}\right), \quad (10)$$

$$\sigma^2_{v_i}=(1-a^2)\sigma_{w_i}^2, \quad (11)$$

The discrete-time equivalent of the exponential smoothing window may be given by $$f_{av}[k] = \frac{1}{d_{av}} \exp\left(\frac{-kd_s}{d_{av}}\right), k \geq 0 \qquad (12)$$

The processed pilot signal strength from base station $BS_i$ may then be obtained as follows:

$$X_i[k] = f_{av}[k] * Y_i[k], k \geq 0 \qquad (13)$$

where * is used here to denote discrete-time convolution. Note that the measured signal strength $Y_i[k]$ may be expressed as:

$$Y_i[k] = m_i[k] + W_i[k] \qquad (14)$$

The relative processed signal strength between base stations $BS_i$ and $BS_j$ may be given by $$X[k] = X_i[k] - X_j[k]. \qquad (15)$$

The evolution of the process $\{X_i[k]\}$ may be governed by the following second-order difference equation:

$$X_i[k] = (a+b)X_i[k-1] - abX_i[k-2] + \qquad (16)$$
$$\frac{1}{d_{av}}(m_i[k] - am_i[k-1]) + \frac{1}{d_{av}} V_i[k], k \leq 2$$

$$X_i[1] = \frac{1}{d_{av}}\{(bm_i[0] + m_i[1]) + (a+b)V_i[0] + V_i[1]\}, \qquad (17)$$

$$X_i[0] = \frac{1}{d_{av}}(bm_i[0] + V_i[0]). \qquad (18)$$

From (16), we see that $\{X_i[k]\}$ is a second-order AR process, a fact that may be exploited later. Various statistical properties of the signal strength process $\{X_i[k]\}$ that may be used in sequels may also be derived.

A model for hysteresis-based hard handoff mechanisms including a new formulation of the handoff problem and the possibility of using a Monte Carlo simulation to obtain handoff performance measures will now be discussed. The MS may make a handoff decision based on the processed pilot signal strengths from the two candidate base stations. In other words, a handoff decision made at time t may be based on the vector $X(t) = (X_i(t), X_j(t))$ in two-dimensional space $\mathcal{R}^2$. A large class of so-called hysteresis-based handoff algorithms may be characterized in terms of a partition of $\mathcal{R}^2$ into three regions (shown in FIGS. 2, 3, and 4):

I: the assignment region for $BS_i$,

J: the assignment region for $BS_j$,

H: the hysteresis region, where the MS may be assigned either to $BS_i$ or $BS_j$.

A handoff decision at time t>0 may be made as follows:

1. If $X(t) \in I$ then a handoff occurs to $BS_i$ unless the MS is already assigned to $BS_i$.

2. If $X(t) \in J$ then a handoff occurs to $BS_j$ unless the MS is already assigned to $BS_j$.

3. If $X(t) \in H$ then no handoff occurs.

At time t=0 the MS becomes active and is assigned to $BS_i$ if $X_i(0) > X_j(0)$ and otherwise to $BS_j$. In this case, the hysteresis level is effectively zero and there are only two assignment regions:

$I_0 = \{(x_j; x_i): x_i > x_j\}$: the assignment region for $BS_i$ at time 0, $J_0 = \{(x_j; x_i): x_i < x_j\}$: the assignment region for $BS_j$ at time 0.

With the above formulation of hysteresis-based handoff, some important special cases may be considered. A class of handoff algorithms preferably operates on the basis of the relative processed signal strength from $BS_i$ and $BS_j$:

$$X(t) = X_i(t) - X_j(t) \qquad (19)$$

Figure 2:
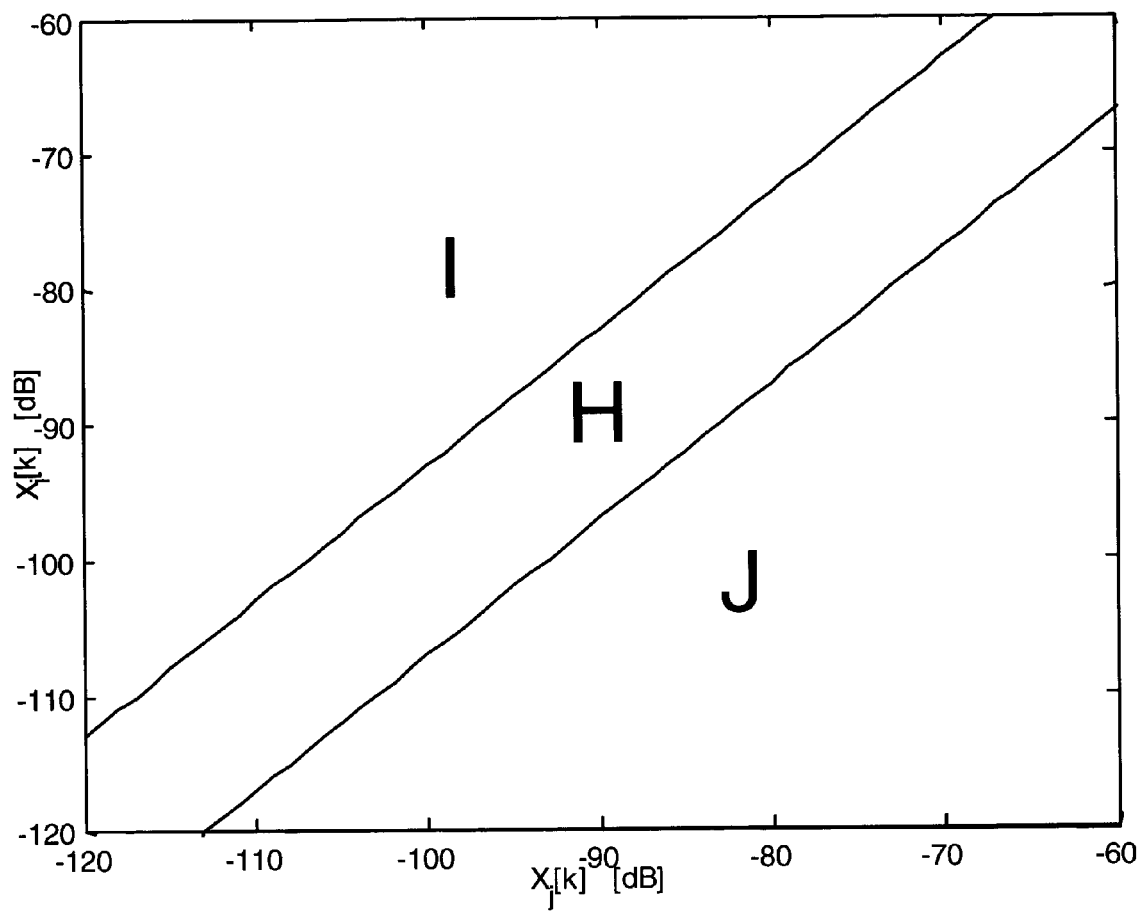
FIG. 2 is a diagram showing assignment regions based on relative signal strength.

A handoff of the mobile user from base station $BS_i$ to base station $BS_j$ may occur when the relative processed signal strength $X(t)$ falls below the value $-h_j$. Conversely, a handoff from base station $BS_j$ to base station $BS_i$ may occur when $X(t)$ exceeds the value $h_i$. The values $h_i$ and $h_j$ may be known as the hysteresis levels associated with base stations $BS_i$ and $BS_j$, respectively. For handoff algorithms based on relative signal strength, the assignment regions may be given as follows:

$I = \{(x_j; x_i): x_i \geq x_j + h_i\}$ $J = \{(x_j; x_i): x_i \geq x_j + h_i\}$ $H = \{(x_j; x_i): x_j - h_i < x_i < x_j + h_i\} = \mathcal{R}^2 - (I \cup J)$ These regions are illustrated in FIG. 2.

Figure 3:
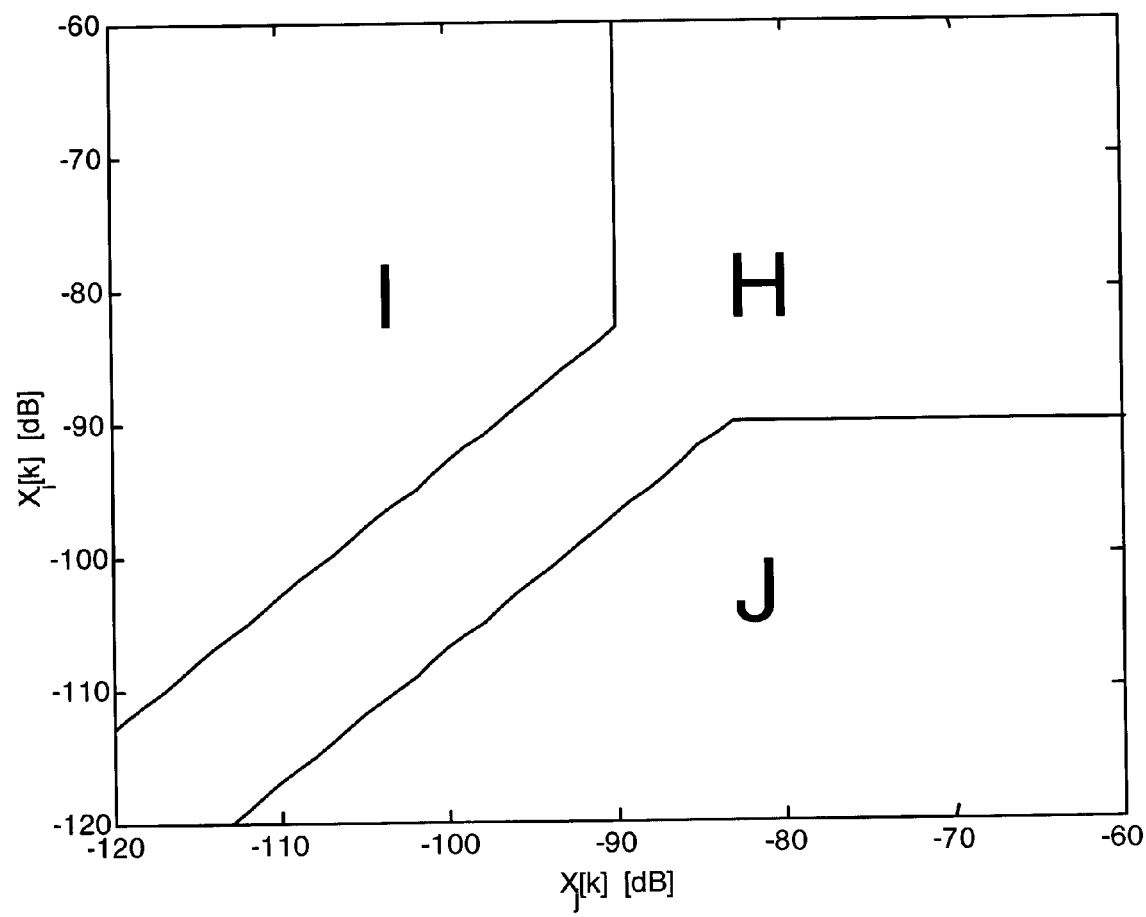
FIG. 3 is a diagram showing assignment regions based on relative signal strengths with absolute thresholds.
Figure 4:
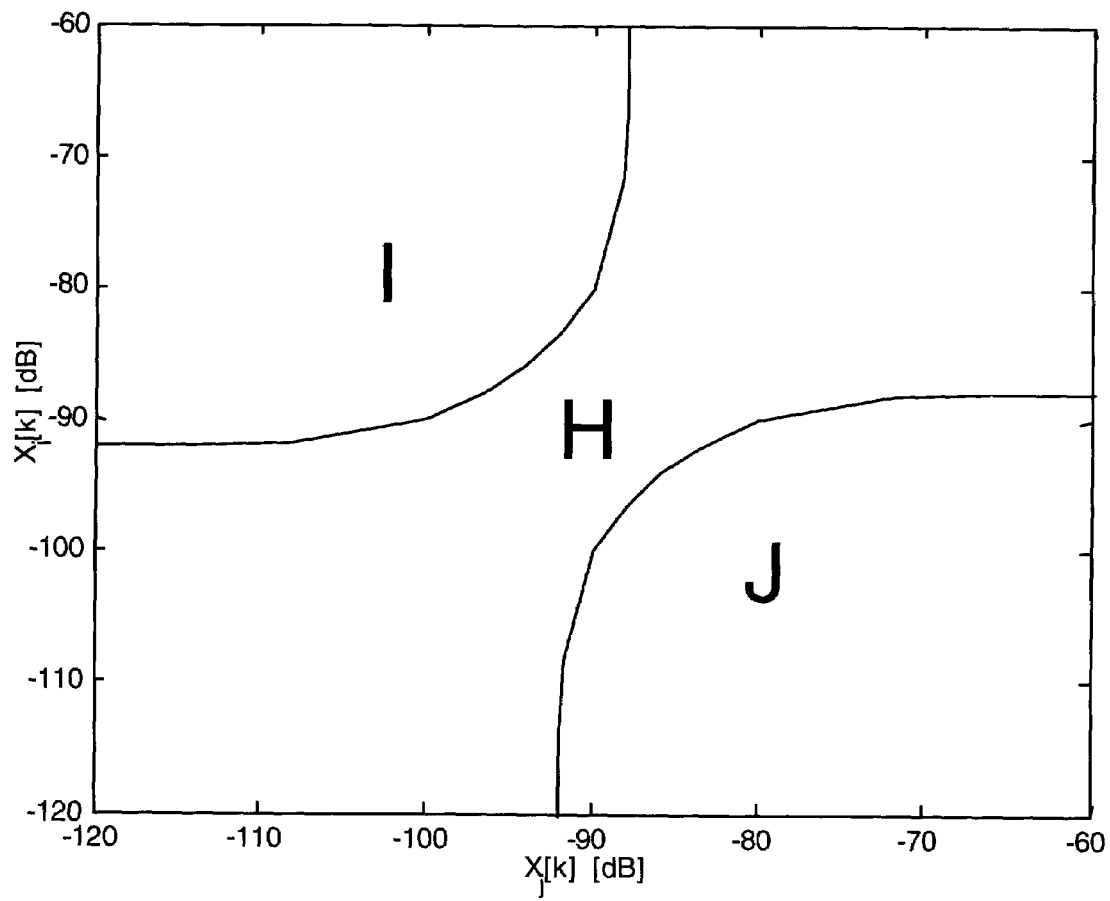
FIG. 4 is a diagram showing nonlinear assignment regions.

Some handoff mechanisms combine relative signal strength with an absolute threshold on the required pilot signal strength. In such mechanisms, a handoff from $BS_i$ to $BS_j$ may occur at time t if and only if $X(t) < h_i$ and $X_i(t) < Th_i$, where $Th_i$ is the absolute threshold on $X_i(t)$. Conversely, a handoff from $BS_j$ to $BS_i$ may occur at time t if and only if $X(t) \geq h_i$ and $X_j(t) < Th_j$. The two-dimensional assignment regions for this handoff algorithm may become:

$I = \{(x_j; x_i): x_i \geq x_j + h_i \text{ and } x_j < Th_j\}$ $J = \{(x_j; x_i): x_i \leq x_j - h_i \text{ and } x_i < Th_i\}$ $H = \mathcal{R}^2 - (I \cup J)$ These regions are illustrated in FIG. 3. Different specifications of the assignment regions lead to different handoff algorithms. A nonlinear assignment region set is illustrated in FIG. 4.

Figure 5:
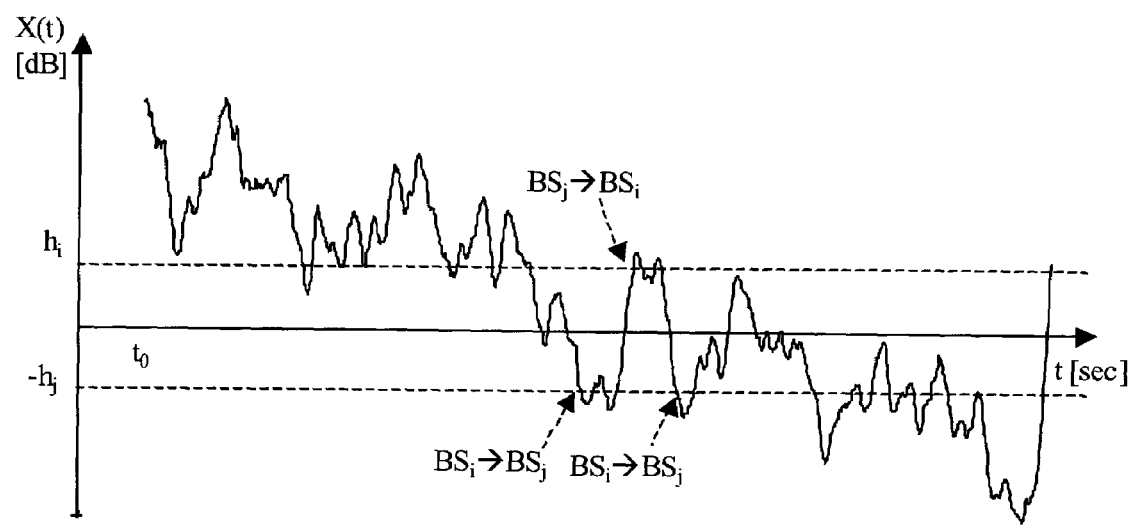
FIG. 5 is a diagram showing handoff as a crossing level problem.

The handoff behavior of an MS traveling along a given trajectory may be viewed as a two-dimensional level-crossing problem. Handoff events may occur when the process $X(t)$ enters the assignment regions I and J. The level-crossing analogy may be more readily visualized in the case of handoff based on relative signal strength. In this case, the handoff decision may be based on the one-dimensional relative signal strength $X(t)$. Handoff events correspond to level-crossings of the process $X(t)$ with respect to the hysteresis levels $h_i$ and $-h_j$. Thus, handoffs from $BS_i$ to $BS_j$ may correspond to downcrossings of $-h_j$, while handoffs from $BS_j$ to $BS_i$ may correspond to upcrossings of $h_i$, as can be seen in FIG. 5.

The handoff analysis of Vijayan and Holtzman (discussed in the background section) is based on the level-crossing analogy. In the asymptotic regime, $h_i = h_j \rightarrow \infty$, the point process formed by the set of upcrossings of $h_i$ and that formed by the set of downcrossings of $-h_j$ approach independent Poisson processes. Based on this result, expressions for handoff performance metrics such as handoff probability and cell assignment probability may be obtained. However, as they point out, the Poisson process assumption is only asymptotically true for large $h_i$ and $h_j$ and is not accurate for smaller values of the hysteresis levels.

In practice, as the MS moves along a given trajectory, it samples and processes the signal strengths from the candidate base stations at discrete time instants. Level crossings between sampling instants do not necessarily lead to actual handoff events. Analysis may rely on the assumption that the sampling interval is sufficiently small such that, at most, one level-crossing event can occur between sampling instants. Thus, the analysis based on the continuous-time model may not capture the effect of varying the sampling interval on handoff behavior.

In the discrete-time model, the relative processed signal strength between base stations $BS_i$ and $BS_j$ may be given by:

$$X[k]=X_i[k]-X_j[k], \quad k \geq 0. \quad (20)$$

Correspondingly, we define $$m[k]=m_i[k]-m_j[k], \quad V[k]=V_i[k]-V_j[k], \quad k \geq 0. \quad (21)$$

Note that process $\{X[k]\}$ satisfies the difference equation obtained from (16) if the subscript i is removed, i.e., $$X[k] = (a+b)X[k-1] - abX[k-2] + \frac{1}{d_{av}}(m[k]-am[k-1]) + \frac{1}{d_{av}}V[k]. \quad (22)$$

For handoff algorithms based on relative signal strength, the cell assignment of the mobile may be determined by the value of $X[k]$, $k \geq 1$. In particular, if the mobile is assigned to $BS_i$ at time $k-1$, then a handoff to $BS_j$ occurs at time k if and only if $X[k]<-h_j$, where $h_j$ is the hysteresis level associated with $BS_j$. Conversely, if the mobile is assigned to $BS_j$ at time $k-1$, then a handoff to $BS_i$ occurs at time k if and only if $X[k]>h_i$, where $h_i$ is the hysteresis level for $BS_i$.

A Monte Carlo sample path of handoff along a trajectory may be generated straightforwardly using the discrete-time model described above. The difference equation characterized by (16)–(18) may determine the processed signal strength $\{X_i[k]\}$. From (6) and (2), the mean pilot signal strength $m_i[k]$ may be given as follows:

$$m_i[k]=v_i-\mu_i \log(\|a-b_i+kvt_s\|). \quad (23)$$

The process $\{V_i[k]\}$ may be simulated simply as a sequence of independent, zero-mean Gaussian random variables with standard deviation $\sigma v_i$. The processed signal strength, $\{V_i[k]\}$, may be generated similarly. The relative signal strength process $\{V[k]\}$, given by (20), may completely determine the handoff behavior of the mobile along the trajectory.

For a given straight-line trajectory, the handoff performance measures of interest include:

Assignment probabilities: Let $P_i[k]$ and $P_j[k]$, respectively, denote the probabilities that the mobile is assigned to $BS_i$ and $BS_j$ at time k.

Handoff probabilities: Let $P_{ij}[k]$ and $P_{ji}[k]$, respectively, denote the probabilities of a handoff from $BS_i$ to $BS_j$ and a handoff from $BS_j$ to $BS_i$ at time k.

Mean number of handoffs: Let $N_{ho}$ denote the number of handoffs between $BS_i$ and $BS_j$ over the given trajectory.

Crossover point: Let C denote the crossover point, which is defined as the point along an arbitrary straight-line trajectory at which the probability of the MS being assigned to $BS_i$ drops below 0:5, given that the probability of assignment to $BS_i$ at time t=0 is greater than 0:5.

To estimate these performance measures using Monte Carlo simulation, N sample paths of the process $\{X[k]\}$ may be generated. For the nth sample path, define:

$$A_i^{(n)}[k] = \begin{cases} 1, & \text{if the moblie is assigned to } BS_i \\ 0, & \text{otherwise} \end{cases} \quad (24)$$

Similarly, $A_j^{(n)}[k]=1$ if the mobile is assigned to $BS_j$ and is equal to zero otherwise. Since, for this embodiment, it is assumed that the mobile is assigned to exactly one of the two base stations while traversing an arbitrary straight-line trajectory, $A_i^{(n)}[k]+A_j^{(n)}[k]=1$. The Monte Carlo estimate of the cell assignment probability to $BS_i$ at time k may then be given by:

$$\hat{P}_i[k] = \frac{1}{N}\sum_{n=1}^{N} A_i^{(n)}[k] \quad (25)$$

Under the assumption discussed above, we have $\hat{P}_i[k]+\hat{P}_j[k]=1$.

Let $A_{ij}^{(n)}[k]=A_i^{(n)}[k-1]A_j^{(n)}[k]$. Then $A_{ij}^{(n)}[k]=1$ if and only if a handoff from $BS_i$ to $BS_j$ occurs at time k in the nth sample path. Similarly, $A_{ji}^{(n)}[k]=A_j^{(n)}[k-1]A_i^{(n)}[k]$ indicates a handoff from $BS_j$ to $BS_i$ at time k in the nth sample path. The Monte Carlo estimate of the cell handoff probability from $BS_i$ to $BS_j$ at time k may be:

$$\hat{P}_{ij}[k] = \frac{1}{N}\sum_{n=1}^{N} A_{ij}^{(n)}[k] \quad (26)$$

A similar expression may hold for the estimate, $\hat{P}_{ji}[k]$, of the cell handoff probability from $BS_j$ to $BS_i$. Let $N_{ho}^{(n)}$ denote the number of cell handoffs that occur over the nth sample path of the process $\{X[k]\}$. The Monte Carlo estimate of the mean number of handoffs may be expressed as:

$$\hat{N}_{oh} = \frac{1}{N}\sum_{n=1}^{N} N_{ho}^{(n)} = \sum_{k=1}^{M}\left(\hat{P}_{ij}[k] + \hat{P}_{ji}[k]\right) \quad (27)$$

An estimate for the crossover point of the trajectory while the MS travels from cell (i) to cell (j) may be given by $$\hat{C}=\arg\min\{0 \leq k \leq M: \hat{P}_i[k] \leq 0.5\} \quad (28)$$

where it is assumed that $\hat{P}_i[0] \geq 0.5$.

Analytical expressions for the handoff performance measures in discrete-time and an outline for an efficient numerical procedure for computing the handoff performance measures will now be discussed. These analytical expressions for the handoff performance measures may be derived based on the discrete-time model just discussed.

First, assignment probabilities will be considered. The sampled and processed signal strength measurements from $BS_i$ and $BS_j$ may be represented by the vector process $X[k]=(X_i[k], X_j[k])$. Let $X[k\backslash r]$ denote the sequence consisting of the r most recent values of $\{X[k]\}$ up to and including time k, where $1 \leq r \leq k+1$:

$$X[k\backslash r]=(X[k-r+1], X[k-r+2], \ldots, X[k]) \quad (29)$$

At any time k, the vector $X[k]$ falls in exactly one of the three assignment regions I, J, and H. Cell assignment of an MS along a given trajectory may be characterized as follows: For $k \geq 1$, if the MS is assigned to $BS_i$ at time $k-1$, a handoff to cell j may occur at time k if and only if $X[k] \in J$. Conversely, if the MS is assigned to $BS_j$ at time $k-1$, a handoff to cell i may occur at time k if and only if $X[k] \in I$. Cell assignment may also be characterized as follows:

Proposition 1: At time $k \geq 1$, the MS is assigned to $BS_i$ if and only if $X[k\backslash k+1] \in I_0 H^k$ or $X[k\backslash r] \in IH^{r-1}$ for some r; $1 \leq r \leq k$. Similarly, the MS is assigned to $BS_j$ if and only if $X[k\backslash k+1] \in J_0 H^k$ or $X[k\backslash r] \in JH^{r-1}$ for some r, where $1 \leq r \leq k$.

Proof: Suppose $X[k\backslash r] \in IH^{r-1}$. This condition is equivalent to $X[k-r+1] \in I$ and $X[l] \in H$, $l=k-r+2, \ldots, k$. Clearly, the MS is assigned to $BS_i$ at time $k-r+1$. Since no handoff occurs at times $l=k-r+2, \ldots, k$, the MS must also be assigned to $BS_i$ at times $l=k-r+2, \ldots, k$. Similarly, if $X[k\backslash k+1] \in I_0 H^k$, then the MS must be assigned to $BS_i$ at time k.

Conversely, assume that the MS is assigned to $BS^i$ at time k. Then, $X[l] \in I$ for some $1 \leq l \leq k$ or $X[l] \in I_0$ for $l=0$. Let $l^*$ be the largest such l. Since the MS is assigned to $BS_i$ at time k, it must be that $X_l \in H$; $m=l^*; \ldots, k$. Setting $r=k-l^*+1$, we have the desired result. The case of assignment of MS to $BS_j$ at time k may be proved similarly.

Let $E_i[k]$ denote the event that the mobile is assigned to base station $BS_i$ at time k. $E_i[k]$ may be referred as the cell i assignment event at time k. By virtue of Proposition 1, $E_i[k]$ may be expressed as follows:

$$E_i[k] = \{X[k/k+1] \in I_0 H^k\} \cup \bigcup_{r=1}^{k} \{X[k/r] \in IH^{r-1}\} \quad (30)$$

For convenience, the following notation is introduced:

$$P_k(AH^{r-1})=Pr\{X[k/r] \in AH^{r-1}\},$$

where A may be I, $I_0$, J, or $J_0$. Noting that the events on the right-hand side of (30) may be mutually exclusive, we have the following:

Proposition 2: The cell assignment probabilities may be expressed as:

$$P_i[k] = Pr(E_i[k]) = p_k(I_0 H^k) + \sum_{r=1}^{k} p_k(IH^{r-1}), \quad (31)$$

$$P_j[k] = Pr(E_j[k]) = p_k(J_0 H^k) + \sum_{r=1}^{k} p_k(JH^{r-1}) \quad (32)$$

Proposition 2 provides a characterization of the cell assignment probabilities under the discrete-time handoff model.

Handoff probabilities will now be considered. Let $E_{ij}[k]$ denote the event that at time k the cell assignment changes from cell i to cell j, i.e., a handoff may occur from cell i to cell j. Similarly, $E_{ji}[k]$ denotes the event that a handoff may occur from cell j to cell i at time k. The cell handoff events may be expressed as $E_{ij}[k]$ and $E_{ji}[k]$ in terms of the cell assignment events defined earlier as follows:

$$E_{ij}[k]=E_i[k-1] \cap E_j[k] \text{ and } E_{ji}[k]=E_j[k-1] \cap E_i[k],$$
$$k \geq 1 \quad (33)$$

Analogous to Proposition 2, the conditions for a handoff event to occur may be expressed as follows.

Proposition 3: For $k \geq 1$, a handoff from i to j may occur at time k if and only if $X[k] \in J$ and $X[k-1\backslash r-1] \in Ih^{r-2}$ for some r; $2 \leq r \leq k+1$ or $X[k-1\backslash k] \in I_0 H^{k-1}$. Similarly, a handoff from $BS_j$ to $BS_i$ may occur at time k if and only if $X[k] \in I$ and $X[k-1\backslash r-1] \in JH^{r-2}$ for some r; $2 \leq r \leq k+1$ or $X[k-1\backslash k] \in J_0 H^{k-1}$.

Hence, the handoff events $E_{ij}[k]$ and $E^{ij}[k]$ may be expressed as follows:

$$E_{ij}[k] = \{X[k\backslash k+1] \in I_0 H^{k-1} J\} \cup \bigcup_{r=2}^{k} \{X[k\backslash r] \in IH^{r-2} J\} \quad (33)$$

$$E_{ij}[k] = \{X[k\backslash k+1] \in J_0 H^{k-1} I\} \cup \bigcup_{r=2}^{k} \{X[k\backslash r] \in JH^{r-2} I\}, k \geq 1 \quad (34)$$

Since the events on the right-hand sides of (34) and (35) are mutually exclusive, the following characterization of the cell handoff probabilities, analogous to Proposition 2, may be made:

Proposition 4: The cell handoff probabilities may be expressed as follows:

$$P_{ij}[k] = Pr(E_{ij}[k]) = p_k(I_0 H^{k-1} J) + \sum_{r=2}^{k} p_k(IH^{r-2} J)k \quad (36)$$

$$P_{ji}[k] = Pr(E_{ji}[k]) = p_k(J_0 H^{k-1} I) + \sum_{r=2}^{k} p_k(JH^{r-2} I), k \geq 1 \quad (37)$$

An important performance measure to estimate the context of a cell assignment model is the mean number of handoffs that occur as the mobile moves along a given trajectory. Let $N_{ho}$ denote the number of handoffs that occur for a mobile moving along a given trajectory. Let $1^E$ denote the indicator function for the event E. The number of handoffs may then be expressed as follows:

$$N_{ho} = \sum_{k=1}^{M} \left( 1_{E_{ij}[k]} + 1_{E_{ji}[k]} \right) \quad (38)$$

Hence, the mean number of handoffs may be given by $$E[N_{ho}] = \sum_{k=1}^{M} (Pr(E_{ij}[k]) + Pr(E_{ji}[k])) \quad (39)$$

Recursive procedure for handoff analysis will now be considered. For handoff algorithms based on relative signal strength, the handoff behavior of the MS may map to the one-dimensional process X[k]. In this case, the assignment regions may be intervals of the real-line: $I=[h_i; \infty]$, $J=[-\infty; h_j]$, and $H=(-h_j; h_i)$. The assignment regions at system initialization time may be $I_0=(0,\infty)$ and $J_0=(-\infty; 0)$. The expressions derived earlier for assignment and handoff probability map straightforwardly to the one-dimensional case. In the one-dimensional case, equation (31) may express the cell assignment probability to $BS_i$ at time k as a summation of probabilities of the form $p_k(IH^{r-1})$.

A recursive procedure for evaluating these probabilities will now be developed. For convenience, X[k] may be denoted by $X_k$. A sequence of bivariate functions $\{g_k(x_{k-1}, x_k), k \geq 1\}$ may be defined as follows:

$$g_1(x_0,x_1) = fx_0x_1(x_0,x_1) \quad (40)$$

$$g_2(x_1,x_2) = \int_{I_0} g_1(x_0,x_1) f_{x_2|x_0x_1}(x_2|x_0,x_1)dx_0 \quad (41)$$

$$g_2(x_{k-1}, x_k) = \int_I fx_{k-2}x_{k-1}(x_{k-2}, x_{k-1}) fx_k|x_{k-2}x_{k-1}(x_k|x_{k-2}, x_{k-1})dx_{k-2} + \\ = \int_H g_{k-1}(x_{k-2}, x_{k-1}) fx_k|x_{k-2}x_{k-1}(x_k|x_{k-2}, x_{k-1})dx_{k-2}, k \geq 3 \quad (42)$$

Here, $fx_{k-1}x_k(x_{k-1},x_k)$ is the joint density of $\{X[k-1],X[k]\}$ and $fx_k|x_{k-2}x_{k-1}(x_k|x_{k-2},x_{k-1})$ is the conditional density of X[k], given X[k−1] and X[k−2]. Expressions for the conditional joint densities may be derived by those skilled in the art. The notation $\int_A$ denotes the standard Riemann integral over the set A. The bivariate functions $g_k$ have the following useful property:

Lemma 1: For $k \geq 2$, $$G_k = \int_H \int_H g_k(x_{k-1}, x_k) dx_k dx_{k-1} = p_k(I_0H^k) + \sum_{r=3}^{k} p_k(IH^{r-1}) \quad (43)$$

With these definitions, the probability of cell assignment to $BS_i$ may be expressed as follows (the corresponding result for the probability of assignment to $BS_j$ being analogous):

Proposition 5:

$$p_i[k] \, p_k(I) + p_k(IH) + \int_H \int_H g_k(x_{k-1},x_k)dx_kdx_{k-1}, k \geq 2, \quad (44)$$

$$p_i[1] = p_1(I) + p_1(I_0H), \quad (45)$$

$$P_i[0] = p_0(I_0) \quad (46)$$

The probabilities $p_k(I)$ and $p_k(IH)$ may be given as follows:

$$p_k(I) = \int_I fx_k(x_k)dx_k, k \geq 0 \quad (47)$$

$$p_k(IH) = \int_I \int_H fx_{k-1}x_k(x_{k-1},x_k)dx_kdx_{k-1}, k \geq 1. \quad (48)$$

Proof: Eqs. (46) and (45) follow directly from Proposition 2 when k=0 and k=1, respectively. For $k \geq 2$, Eq. (44) follows from Proposition 2 and Lemma 1.

The handoff probability from $BS_i$ and $BS_j$ may be expressed similarly in terms of the functions $g_k$ (the corresponding result for the probability of handoff from $BS_j$ to $BS_i$ being analogous):

Proposition 6:

$$p_{ij}[k] \, p_k(IJ) \int_H \int_J g_k(x_{k-1}, x_k)dx_kdx_{k-1}, k \geq 2, \quad (49)$$

$$p_{ij}[1] = p_1(I_0J). \quad (50)$$

The probability $p_k(IJ)$ may be given as follows:

$$p_k[IJ] = \int_I \int_J fx_{k-1}x_k(x_{k-1},x_k)dx_kdx_{k-1}, k \geq 1. \quad (51)$$

Figure 6:
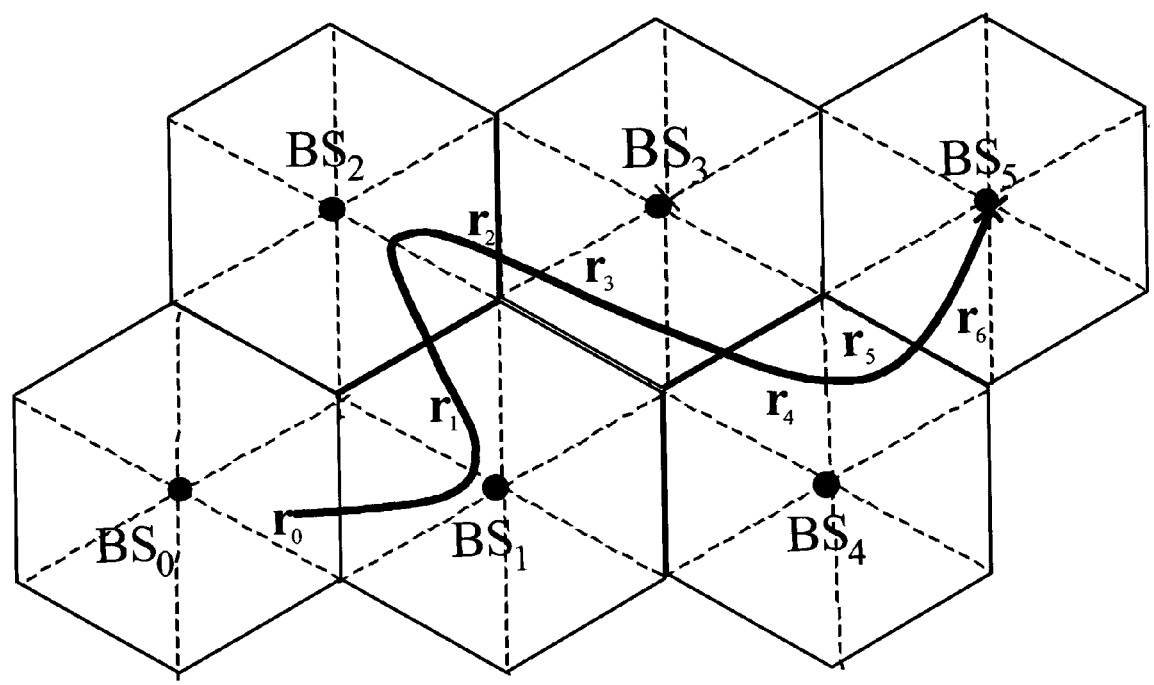
FIG. 6 is a diagram showing a mobile trajectory in a cellular network.

A methodology for characterizing handoff performance over arbitrary mobile trajectories in a cellular network having a regular hexagonal cell pattern will now be disclosed. It is envisioned that this approach may be extended to networks with other types of regular cell structure. FIG. 6 illustrates an example of a mobile trajectory inside a wireless network covered by hexagonal cells. In the hard handoff scheme, at a given location, only the two base stations closest to the mobile unit are involved in the cell assignment process. (Of course, in a soft handoff scheme, more that two base stations would be involved). The two base stations preferably define a rhombus in which the major diagonal is a line segment joining the two base stations. This rhombus may be referred to as a minimum geometric structure (MGS).

Figure 7:
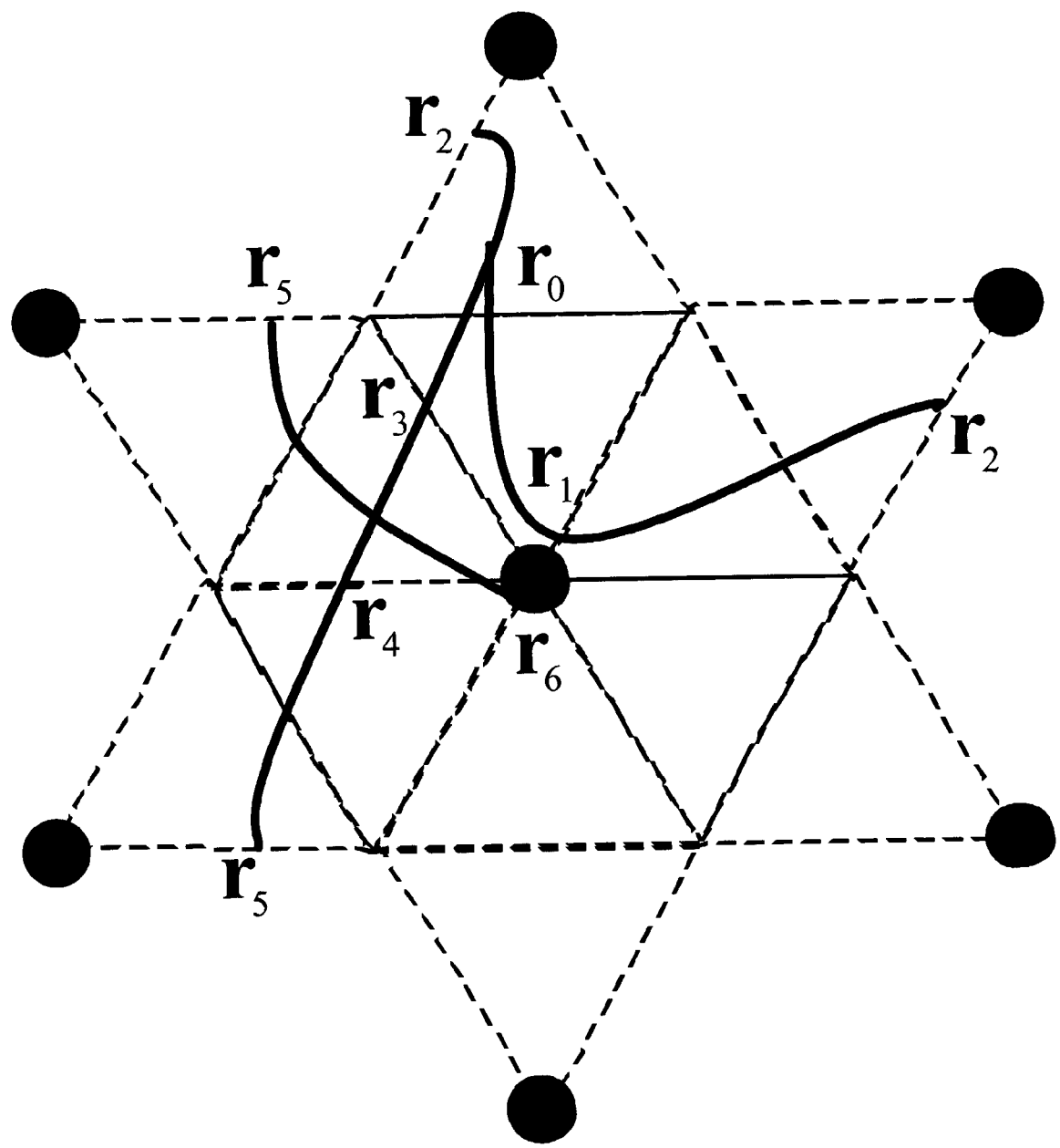
FIG. 7 is a diagram showing a reduced geometric structure.
Figure 8:
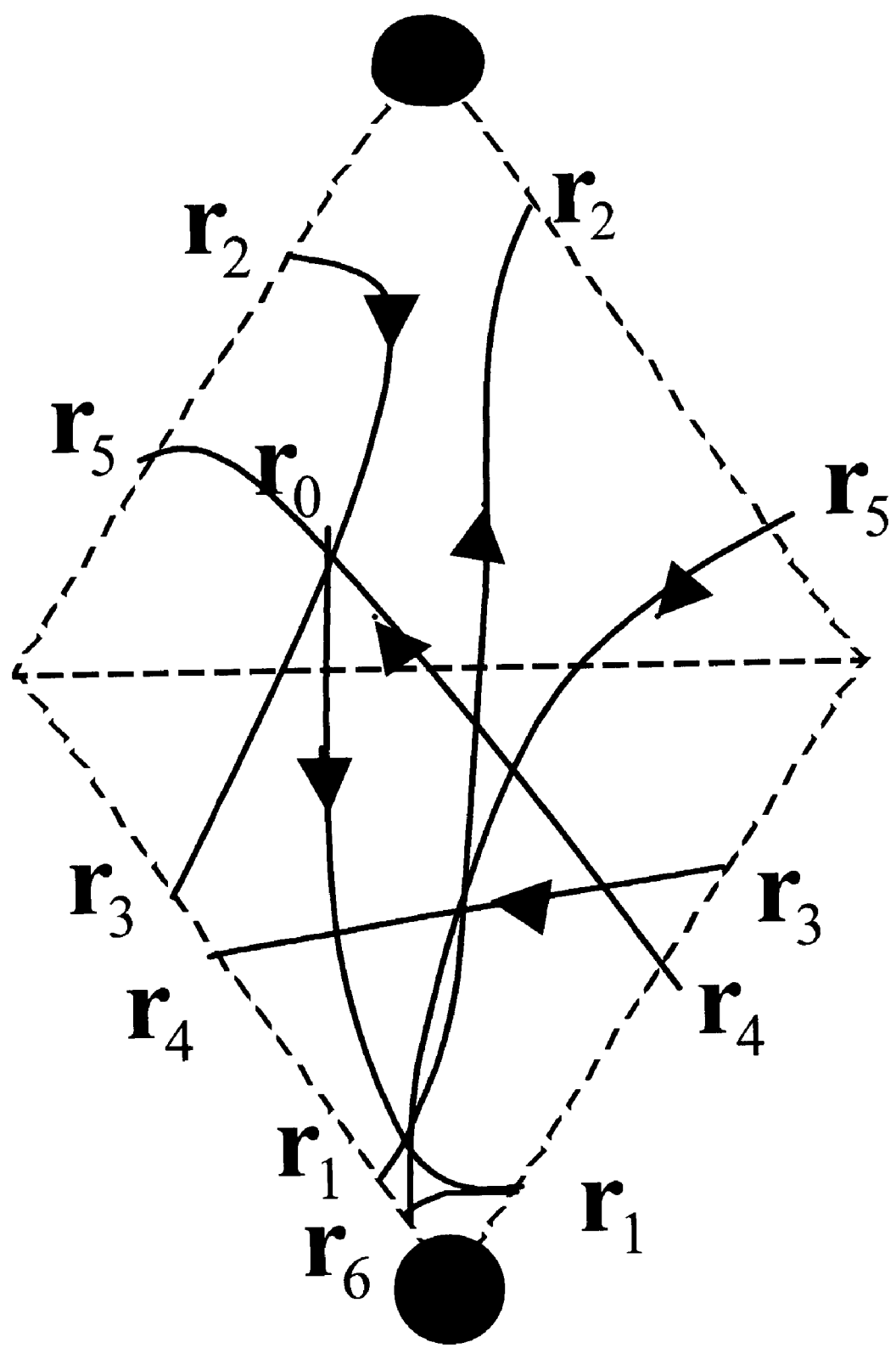
FIG. 8 is a diagram showing a minimum geometric structure.

For the purposes of modeling and analyzing hard handoff performance, an arbitrary trajectory may be mapped into a single instance of an MGS. In order to accomplish this, the concept of a reduced geometric structure (RGS) is introduced first. As shown in FIG. 7, an RGS may be a star-shaped object consisting of a hexagonal cell at the center and six triangular regions subtending the edges of the hexagon. The mapping of the cellular network into a single MGS may be performed in two steps:

1. translation of all path segments into a single reduced geometric structure (RGS); and
2. rotation of all path segments within the RGS into a single MGS.

In the hexagonal cellular network, the RGS preferably has the shape of a star, with a base station at the center and six neighboring base stations situated at the vertices of the star. The RGS may be viewed as consisting of six MGSs, one corresponding to each of the vertices.

The mapping of a mobile trajectory in a cellular network into an RGS is illustrated in FIGS. 6 and 7. In FIG. 6, base station BS, lies at the center of an RGS that is chosen as the base RGS. The mobile trajectory begins at location $r_0$ in the RGS centered at $BS_1$ and enters the RGS centered at $BS_3$, at location $r_2$. Since the path segment $r_0r_2$ lies entirely within the base RGS, no translation may be required. The path segment $r_2r_5$ lies within the RGS centered at $BS_3$ and should be translated to the base RGS. This may be done by translating the RGS centered at $BS_3$ to the RGS centered at $BS_1$. FIG. 7 shows the segments of the original trajectory that have been translated to the base RGS. For example, the path segment $r_2r_5$, originally lying within the RGS centered at $BS_3$ in FIG. 6 has been translated to its corresponding position within the base RGS in FIG. 7. Similarly, the path segment $r_5r_6$, originally lying within the RGS centered at $BS_4$ has been translated to its corresponding position in the base RGS in FIG. 7. Thus, FIG. 7 shows a representation of the original mobile trajectory in the cellular network that has been mapped to a single base RGS via translation.

Figure 9:
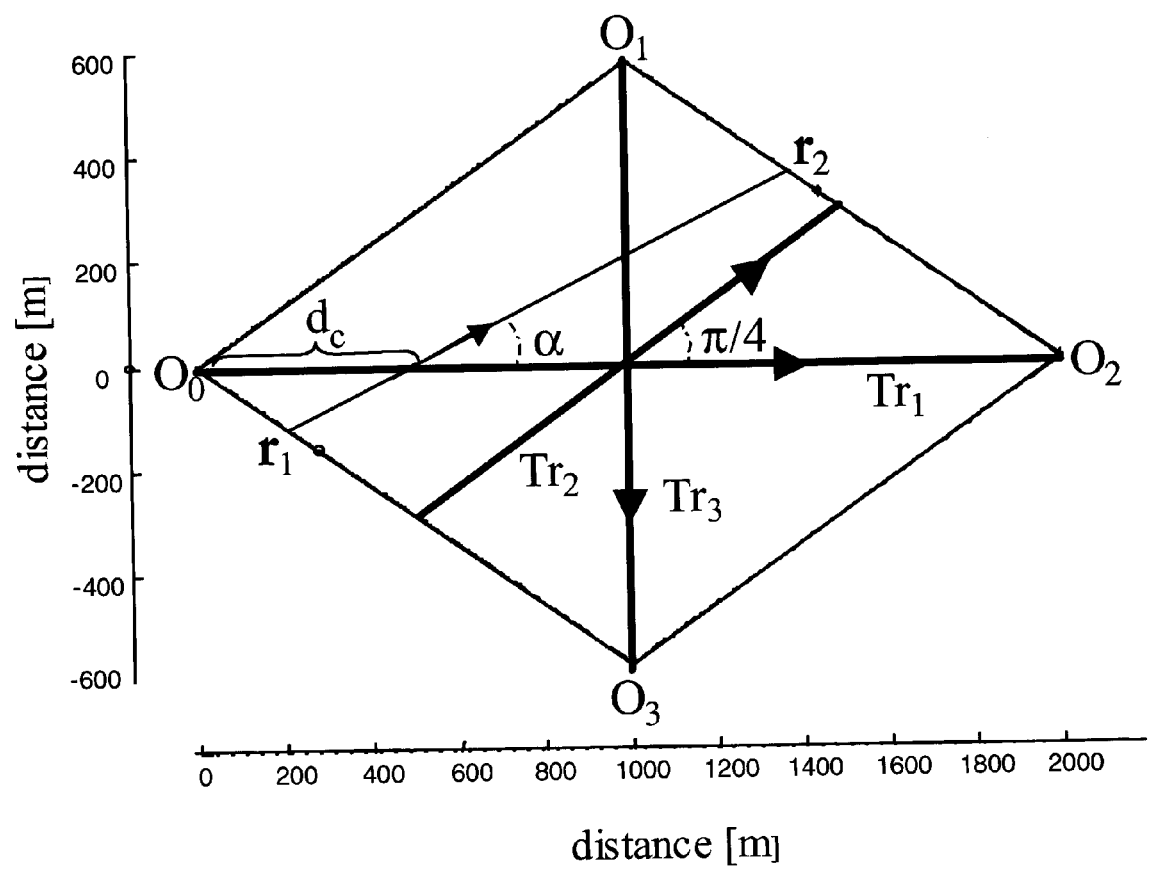
FIG. 9 is a diagram showing straight-line trajectories within a minimum geometric structure.

The trajectory segments shown in the base RGS of FIG. 7 may be further mapped into an MGS via rotations. The RGS in FIG. 7 consists of six rhombi corresponding to the vertices of the RGS. The rhombus corresponding to the leftmost vertex of the RGS to serve as the base MGS may be chosen. The remaining five MGSs may each be rotated in turn to coincide with the base MGS. Within an MGS, a trajectory that passes from one boundary to another may be approximated by a line segment. As shown in FIG. 9, the segment $r_1r_2$ may be characterized uniquely by the crossing point located at the distance d from $O_0$ and the angle $\alpha$, which it forms with $(O_0O_2)$. A set of line segments within the MGS may be generated by the parameter pair (d; $\alpha$) over the range (0; $d_{max}$)×(0; $\pi$) using a particular step pair ($\delta_d$; $\delta_\alpha$). The overall handoff performance within a cellular network may be characterized in terms of the mean number of handoffs along each segment in the set of generated line segments.

Numerical evaluations of handoff performance obtained using embodiments of the present invention will now be discussed. Comparisons were made with results obtained from Monte Carlo simulation as well as the alternative analytical approaches mentioned earlier. First we evaluate the cell assignment and handoff probabilities along two representative trajectories $Tr_1$ and $Tr_2$ shown in FIG. 9. Within the minimum geometric structure of FIG. 9, the trajectories $Tr_1$ and $Tr_2$ are characterized by the parameter pairs $(d_1; \alpha_1)=(0; 0)$ and $(d_2; \alpha_2)=(1000; \pi/4)$, respectively. Also evaluated is the impact of the hysteresis parameter h on the mean number of handoffs and the crossover point for the two trajectories. Finally, handoff performance over the set of straight-line trajectories generated within a minimum geometric structure is evaluated.

Numerical results may be obtained using an embodiment implemented in MATLAB of the recursive procedure described earlier. The implementation represents the bivariate function $g_k(x_{k-1},x_k)$ as a matrix over a finite grid of points in two-dimensional space. The integrals that appear in the recursive procedure are approximated by trapezoidal integration. The numerical procedure may be made arbitrarily more accurate by using a larger matrix corresponding to a grid of higher granularity, but at the expense of greater storage requirement and higher computational cost. The procedure computes assignment probabilities to an error of less than $10^{-6}$. The overall computational complexity of the procedure at each iteration is $O(h_2)$, where h is the hysteresis parameter. It is believed that this implementation is more efficient than Monte Carlo simulation for an equivalent level of accuracy.

For the illustrative numerical computations presented, the main system parameters were set as follows: D=2000 m, $v_i$=0 dB, $u_i$=30 dB, $\sigma w_i$=6 dB, $d_o$=20 m, $d_s$=1 m. The decay distance of the smoothing window $d_{av}$ was set to 10 m. For comparison purposes, numerical results obtained using the following alternative approaches to the handoff performance evaluation are also shown:

Monte Carlo simulation;
Poisson approximation model of Vijayan and Holtzman; and
Approximate discrete-time model of Zhang and Holtzman.

Figure 10:
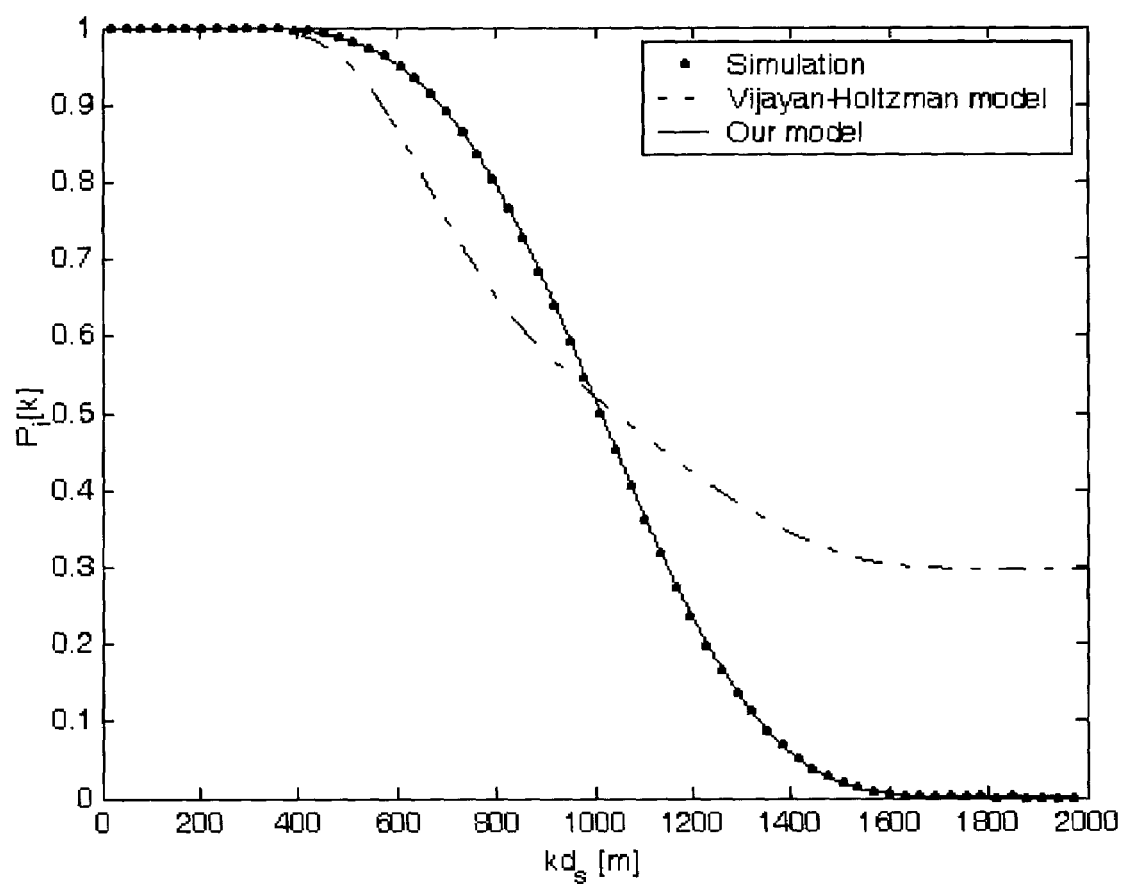
FIG. 10 shows probabilities of being assigned to station $BS_i$ along the trajectory Tr1 with h=1.
Figure 11:
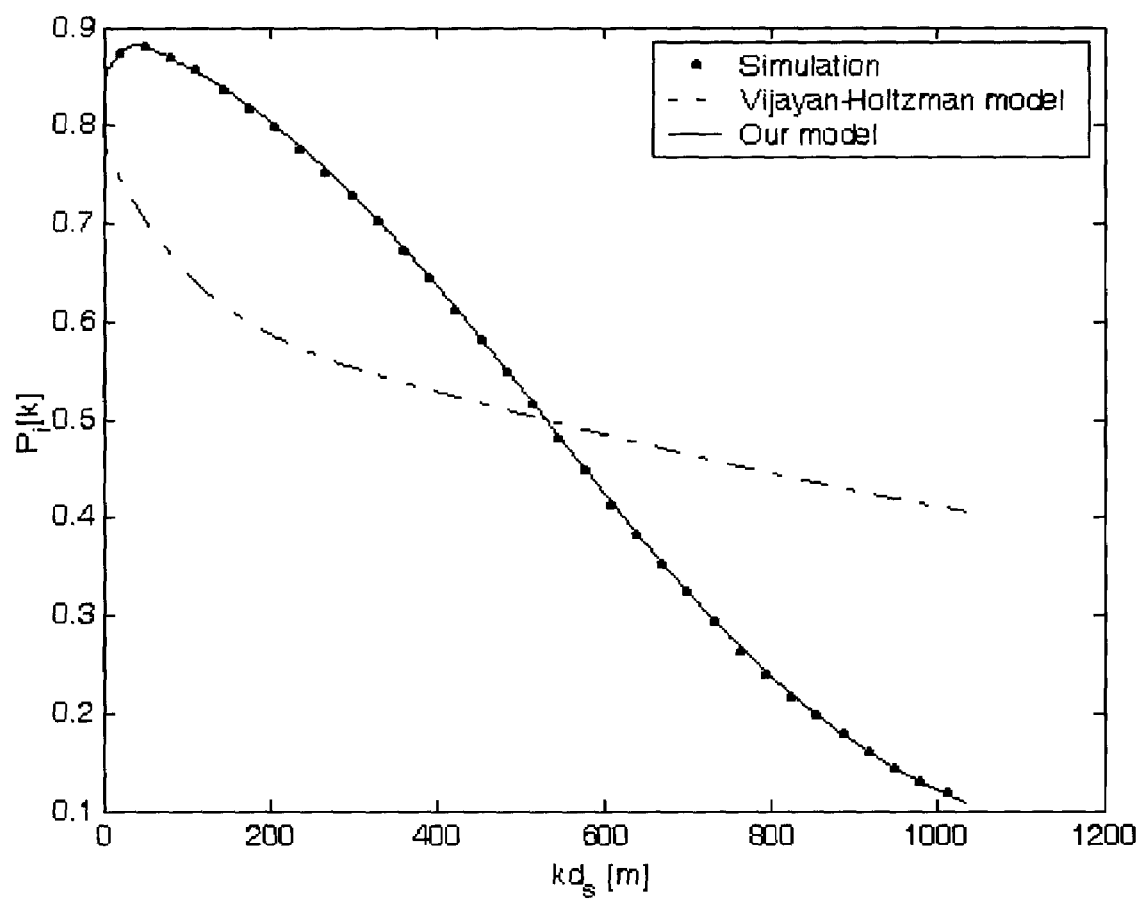
FIG. 11 shows probabilities of being assigned to base station $BS_i$ along the trajectory Tr2 with h=1.

FIG. 10 shows the probability that the mobile station is assigned to base station $BS_i$ as a function of the sampled distance along the trajectory $Tr_1$ when the hysteresis parameter is set to h=1. The curve obtained from the present model matches closely that obtained from the Monte Carlo simulation. Since the mobile begins at $BS_i$, the assignment probability is initially 1 and then decreases monotonically to 0 as it approaches $BS_j$ along the straight-line trajectory. The cell assignment probability along $Tr_1$ obtained using the Vijayan-Holtzman model is also plotted in FIG. 10. The assignment probabilities obtained from the Vijayan-Holtzman model show inaccuracies, and a bias may be seen in the crossover point. For relatively small hysteresis levels, the Vijayan-Holtzman model does not appear to provide a good estimate for the crossover point and the mean number of handoffs. Similar observations may be made with respect to FIG. 11, which shows the assignment probability to base station $BS_j$ as the mobile station moves along the trajectory $Tr_2$ for a hysteresis value of h=1.

Observe in FIG. 10 that the crossover point is approximately equal to the halfway point along the trajectory, i.e., 1000 m. The ideal assignment probability curve along the trajectory $Tr_1$ is a step function with a step discontinuity from the level 1 to the level 0 at the halfway point. As the hysteresis level h is increased, the assignment probability curve more closely approximates a step function as may be seen in FIG. 12. However, in this case, as the value of the crossover point increases, a larger handoff delay is implied. Therein lies a critical tradeoff in dimensioning the parameter h for hysteresis-based handoff algorithms.

Figure 12:
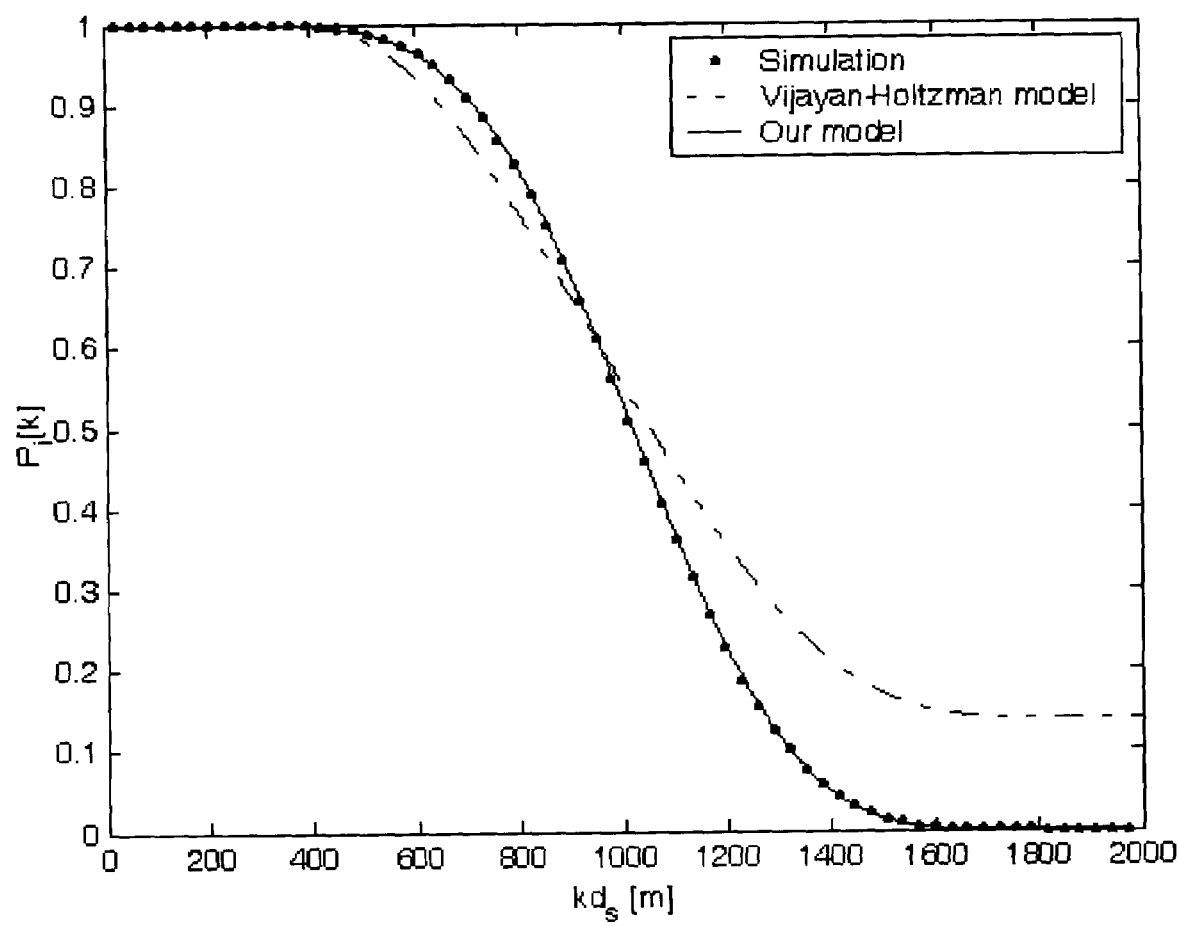
FIG. 12 shows probabilities of being assigned to station $BS_i$ along the trajectory Tr1 with h=3.
Figure 13:
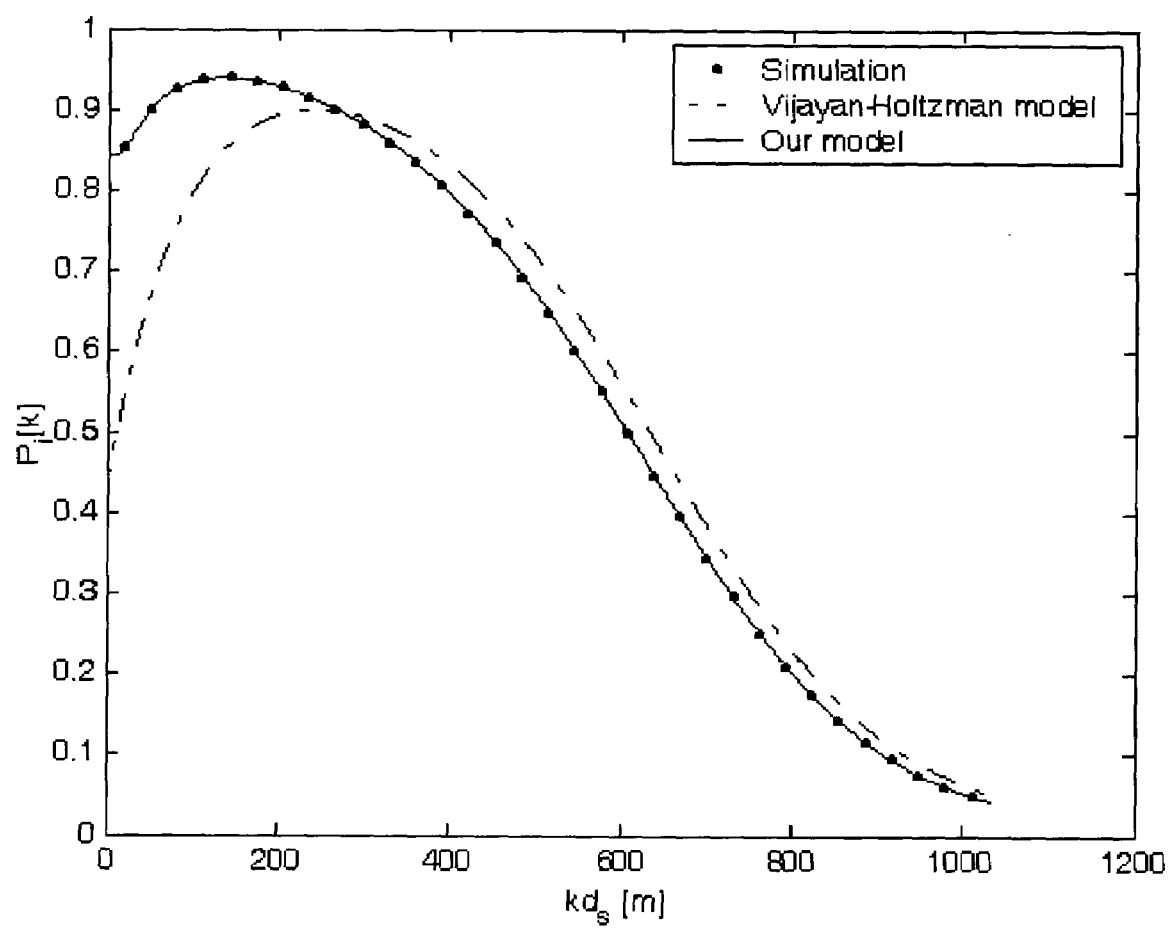
FIG. 13 shows probabilities of being assigned to station $BS_i$ along the trajectory Tr2 with h=10.

Comparing the Vijayan-Holtzman results in FIGS. 10 and 12, the results may become more accurate as h is increased. As noted by Vijayan and Holtzman, the Poisson model is asymptotically accurate as the value of the parameter h is increased. However, as shown in FIG. 13, even when h=10, a discrepancy may be observed between the assignment probability curve from the Vijayan-Holtzman model and that from simulation and this analysis. Also note that there is significant error in the first couple of hundred meters, which is approximately the radius of a microcell. This is most likely because the model does not take into account the transient behavior due to system initialization when the MS becomes active. This effect is more pronounced for larger h.

Figure 14:
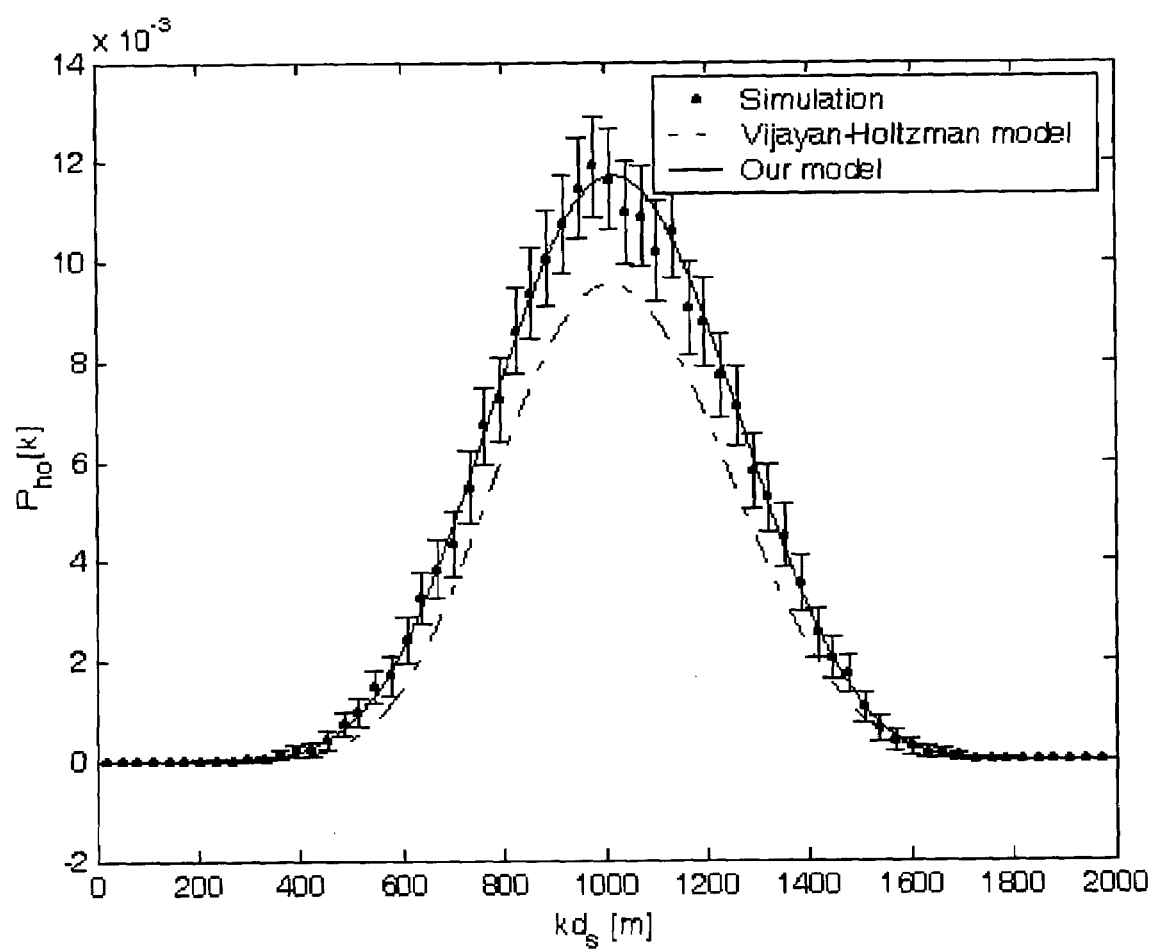
FIG. 14 shows probabilities of handoff from $BS_i$ to $BS_j$ along the trajectory Tr1 with h=3.

FIG. 14 shows the probability of the mobile station being handed off from $BS_i$ to $BS_j$ as it moves along trajectory $Tr_1$ when the hysteresis parameter is set to h=3. The simulation results are shown along with 95% confidence intervals. The curve obtained from our analysis agrees closely with the simulation curve, whereas the curve obtained from the Vijayan-Holtzman model underestimates the handoff probabilities.

Figure 15:
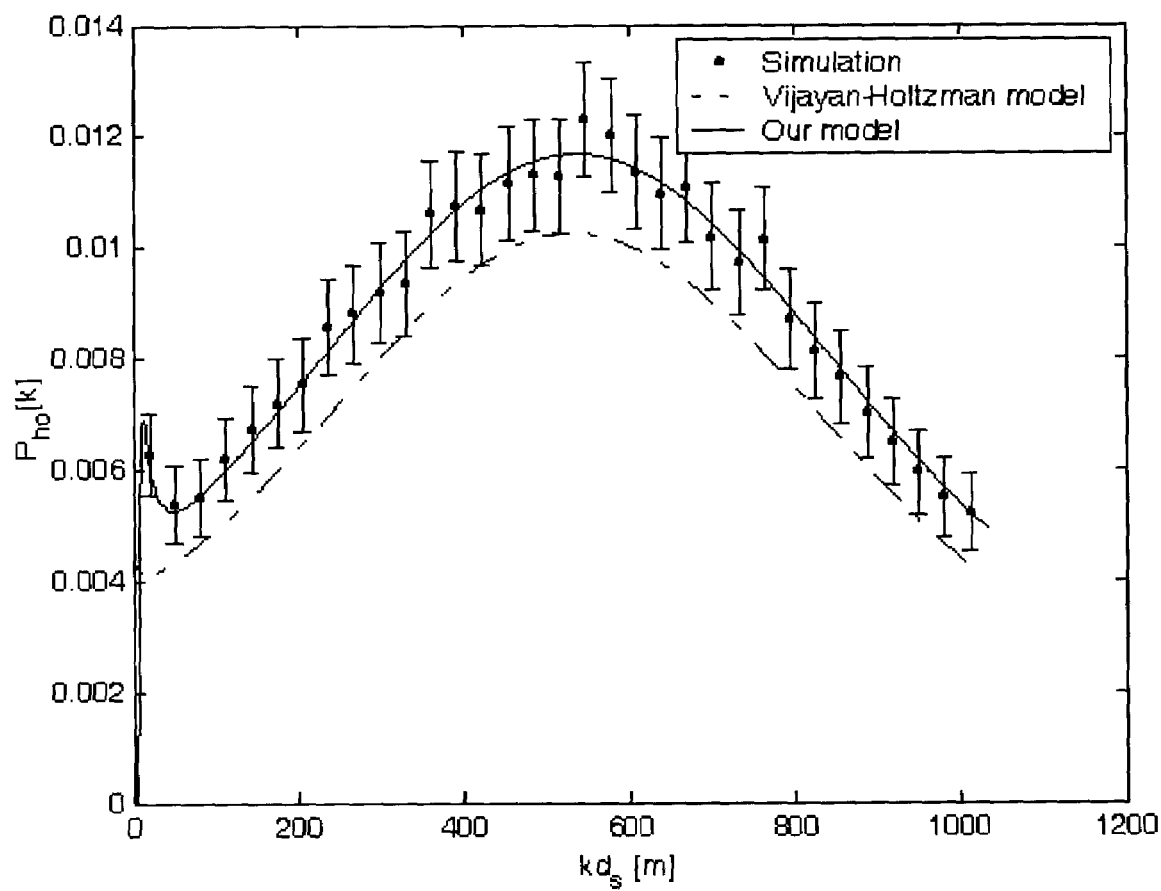
FIG. 15 shows probabilities of handoff from $BS_i$ to $BS_j$ along the trajectory Tr2 with h=3.

Similar observations may be made with respect to FIG. 15, which shows the handoff probabilities for the mobile station moving along trajectory $Tr_2$. For both trajectories, the handoff probability increases to a maximum value near the crossover point. It should further be noted that for small values of the handoff probabilities, a large number of simulations may be required, making the present analytical approach an attractive alternative to simulation.

Figure 16:
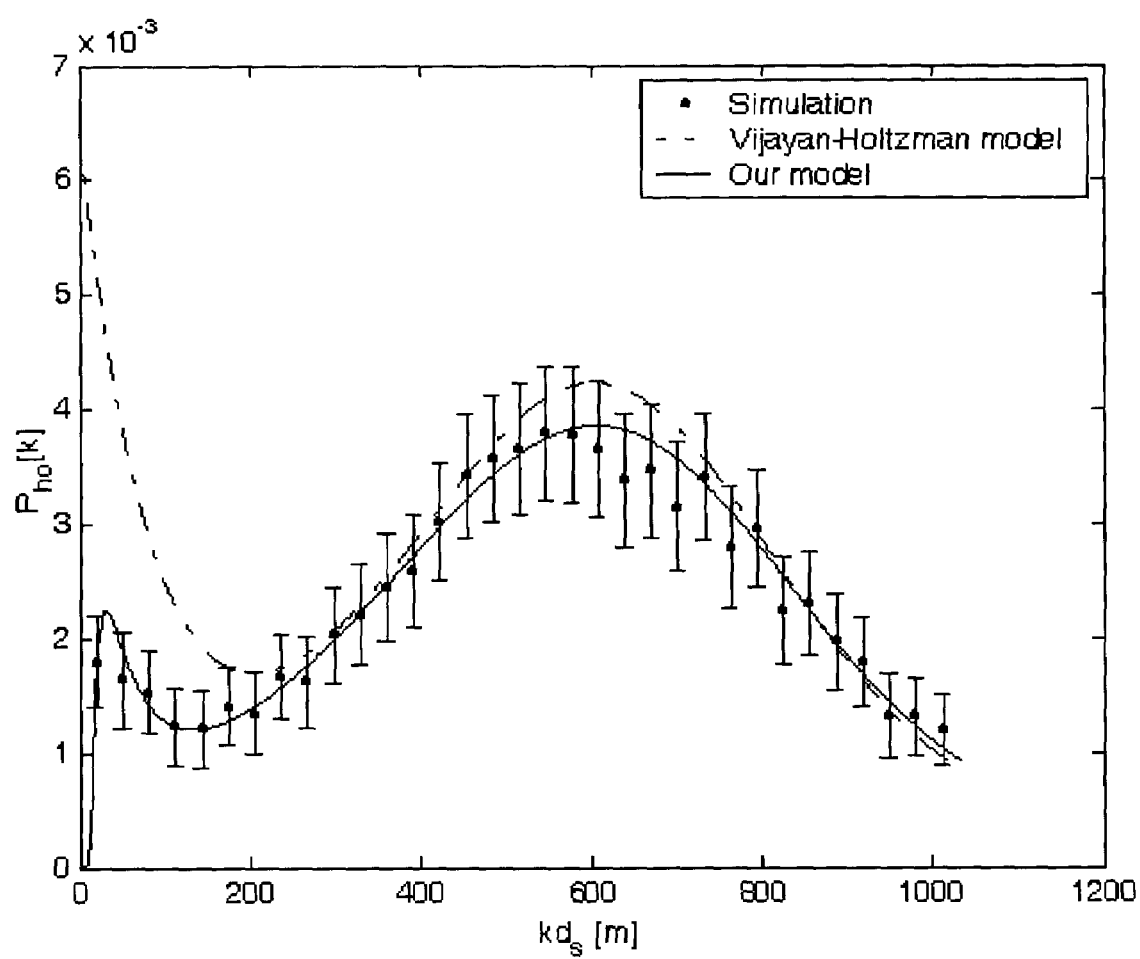
FIG. 16 shows probabilities of handoff from $BS_i$ to $BS_j$ along the trajectory Tr2 with h=10.
Figure 17:
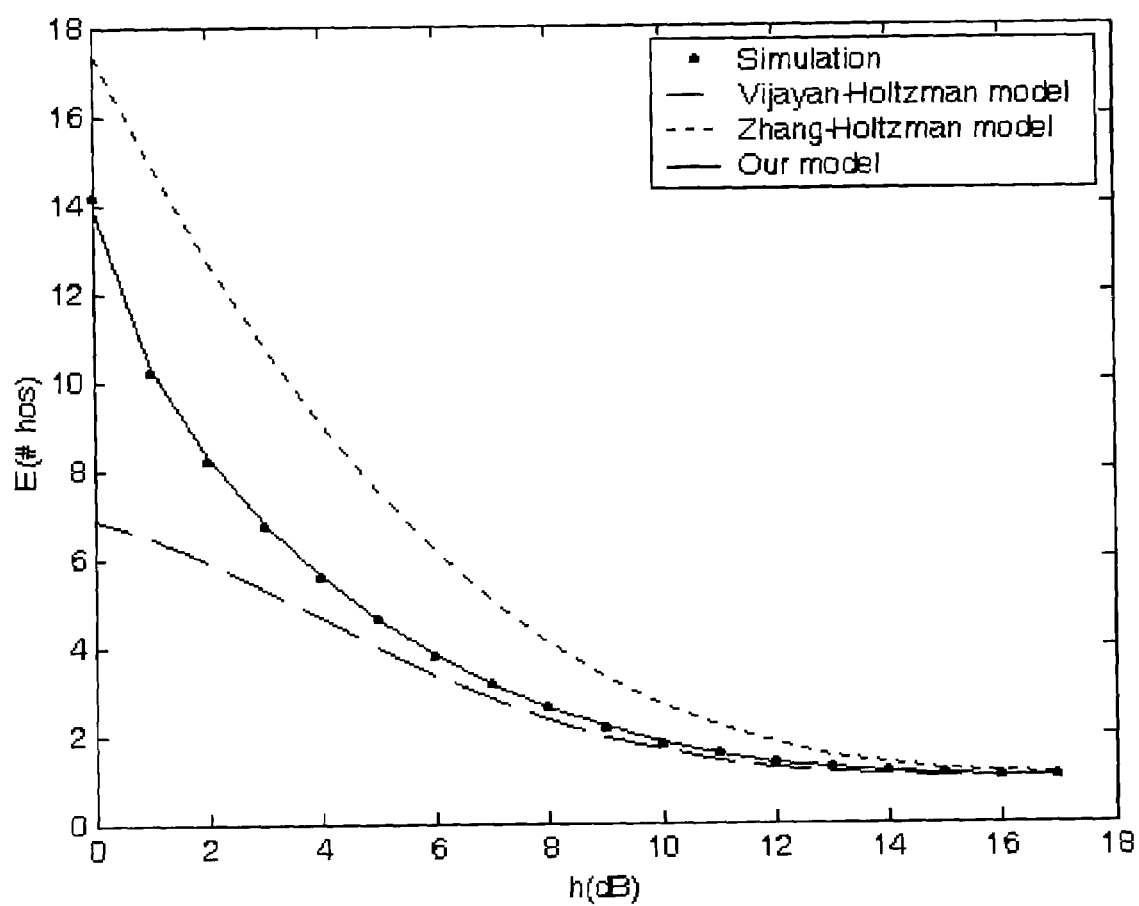
FIG. 17 shows analysis and simulation for the mean number of handoff following the trajectory Tr1.
Figure 18:
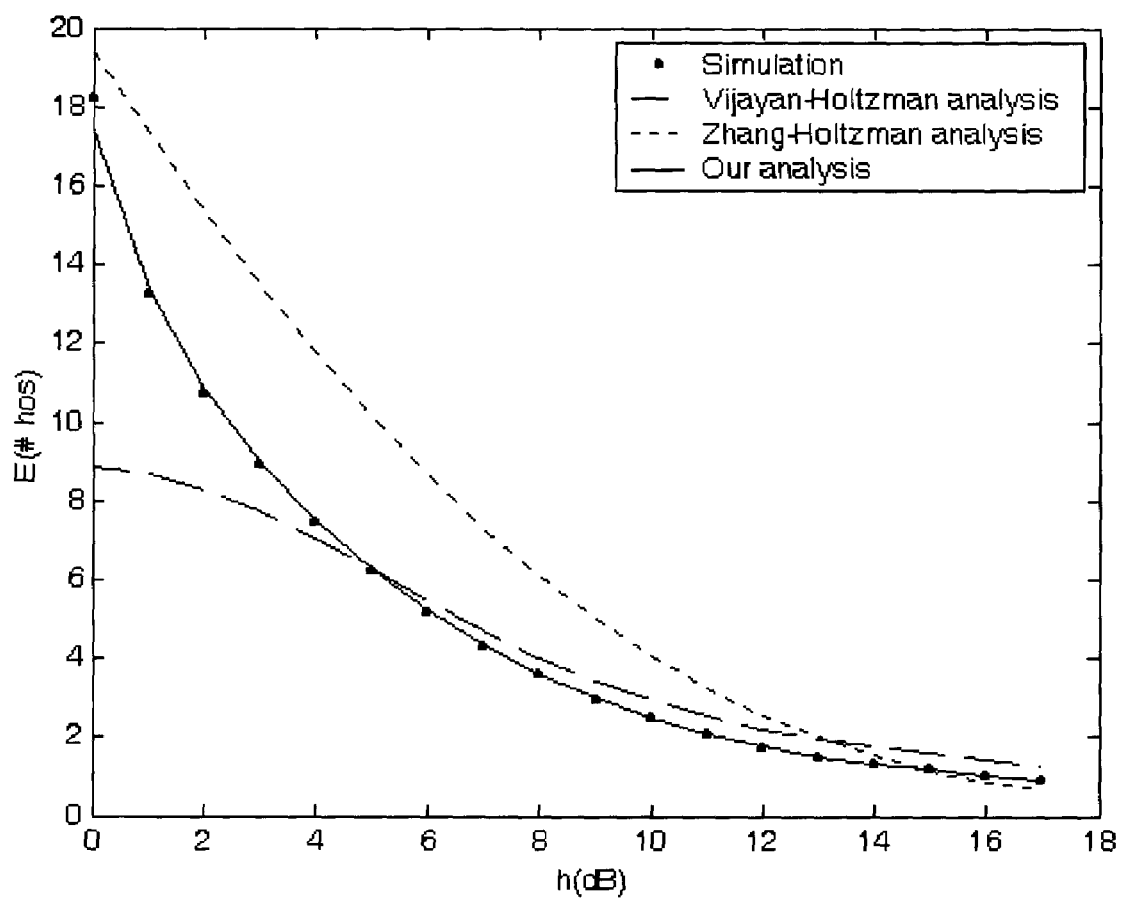
FIG. 18 shows analysis and simulation for the mean number of handoff following the trajectory Tr2.

A main performance measures used in the design and optimization of the 2G wireless networks are the mean number of handoffs and the crossover point. In FIG. 17, the mean number of handoffs for a mobile station moving along trajectory $Tr_1$ is plotted as a function of the hysteresis parameter h using the four methods discussed above. The present analytical results agree closely with those obtained from Monte Carlo simulation. Note that the Zhang-Holtzman model overestimates the mean number of handoffs over almost the entire range of hysteresis values. The Vijayan-Holtzman model underestimates the mean number of handoffs when h is less than 5, while for h>5, this model shows close agreement with the present model and Monte Carlo simulation. However, as shown in FIG. 16, the Vijayan-Holtzman model does not capture the transient handoff behavior at the beginning of the MS trajectory for the first couple of hundred meters.

Figure 19:
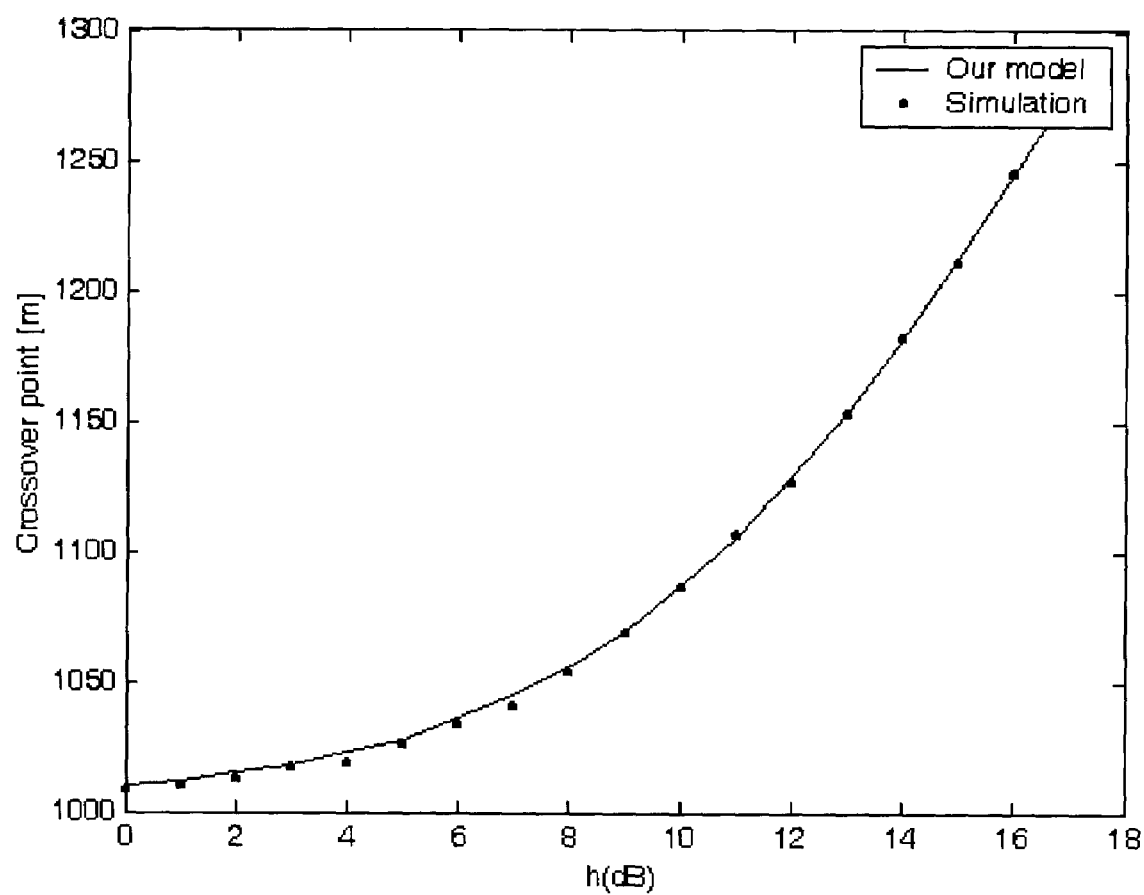
FIG. 19 shows delays in handing off following the trajectory Tr1.
Figure 20:
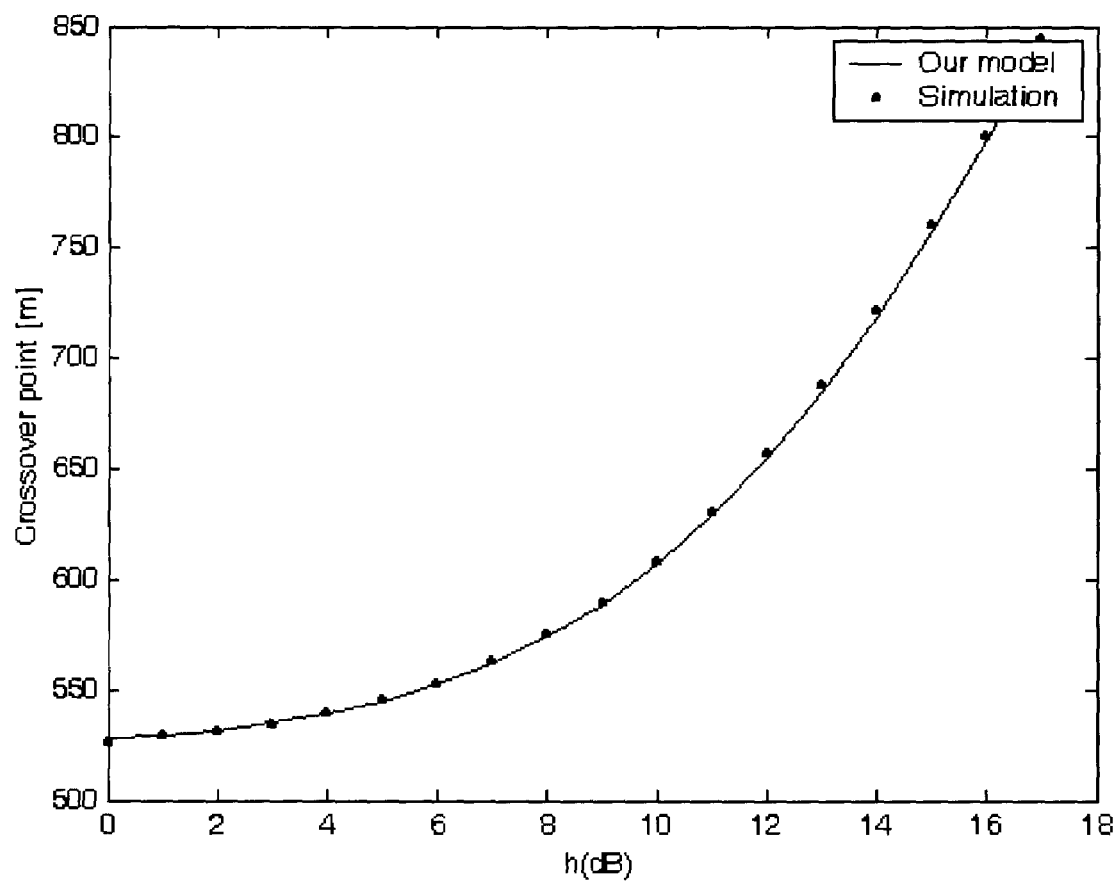
FIG. 20 shows delays in handing off following the trajectory Tr2.

FIG. 19 plots the crossover point as a function of the hysteresis parameter for the mobile station moving along trajectory $Tr_1$. FIG. 20 shows the corresponding results for $Tr_2$. In both figures, results from simulation and the analytical model are shown. The general trend is that the crossover point increases as the hysteresis level increases. Thus, larger hysteresis levels result in larger delays in handoff. On the other hand, as observed earlier, the mean number of handoffs decreases with increasing hysteresis level. Depending on the application, different tradeoffs between the mean number of handoffs and the crossover point may be desirable. The hysteresis parameter should be chosen accordingly.

Figure 21:
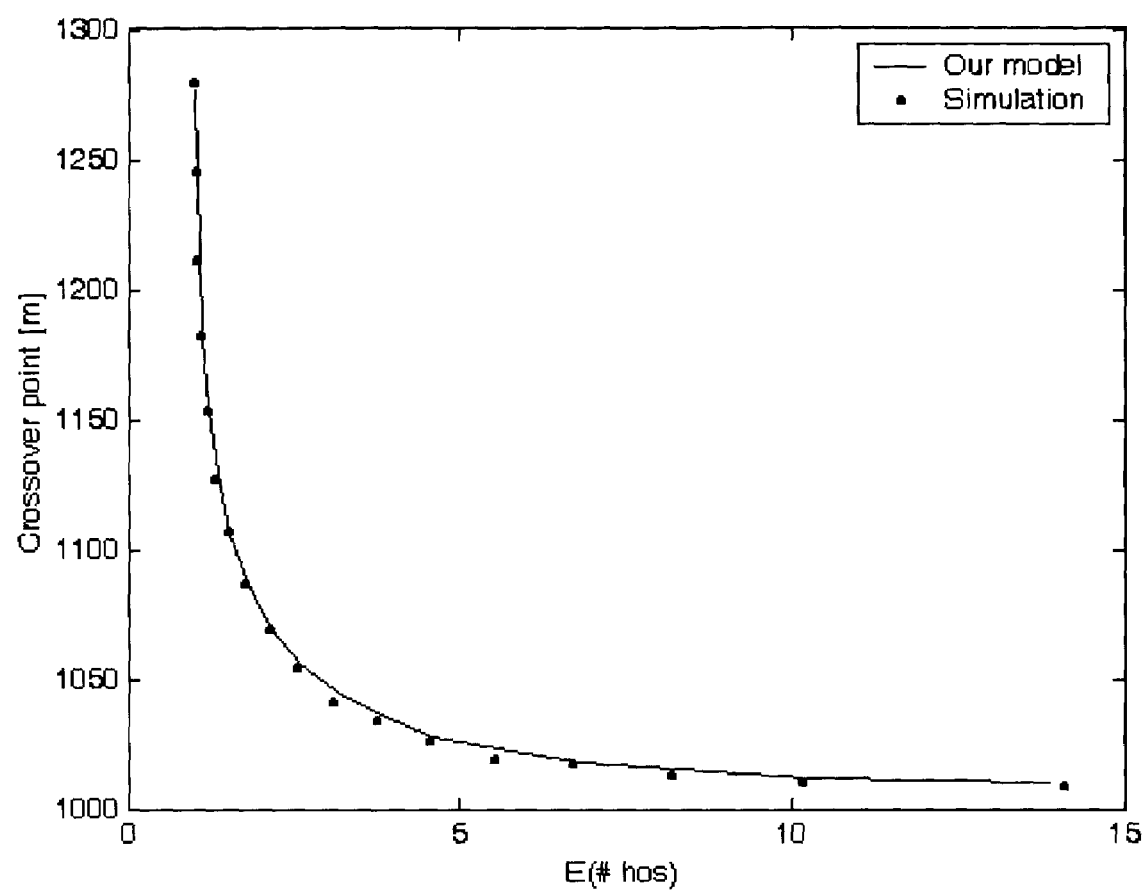
FIG. 21 shows crossover points vs. mean number of handoffs for Tr1.
Figure 22:
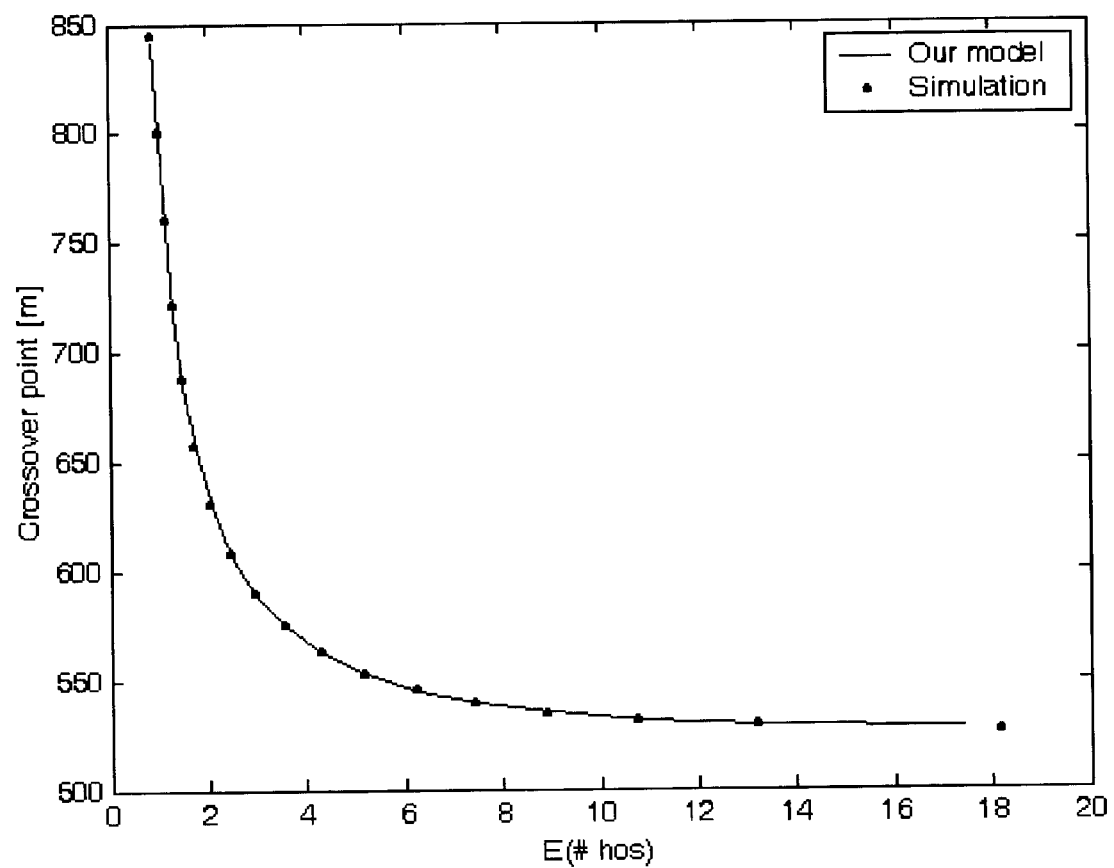
FIG. 22 shows crossover points vs. mean number of handoffs for Tr2.

In general, it is desirable to minimize the number of handoffs while having as small a handoff delay as possible. A small handoff delay may be particularly important for the design and dimensioning of 3G systems, since the allocated bandwidth is significantly larger than for 2G systems. As seen earlier, small handoff delay may be achieved by using small values for the hysteresis parameter. On the other hand, small hysteresis levels may imply a larger number of handoffs. The tradeoff between crossover point and mean number of handoffs for trajectories $Tr_1$ and $Tr_2$ is illustrated explicitly in FIGS. 21 and 22, respectively. In both figures, the optimum operating point will typically lie in the neighborhood of the knee of the curve.

Using the minimum geometric structure introduced earlier (see FIG. 9), the mean number of handoffs for a cellular network with hexagonal structure may be characterized as a surface. In particular, we characterize the mean number of handoffs over a set of line segments within a minimum geometric structure $(O_0 O_1 O_2 O_3)$.

The set of line segments for the set of line segments generated by the following set of relations may be shown as:

$$\{(d,\alpha)\in(0,2000)\times(0,\pi);(d_c,\alpha)=k(\delta_{d_c},\delta_\alpha),k=0,1,\ldots\} \quad (53)$$

Figure 23:
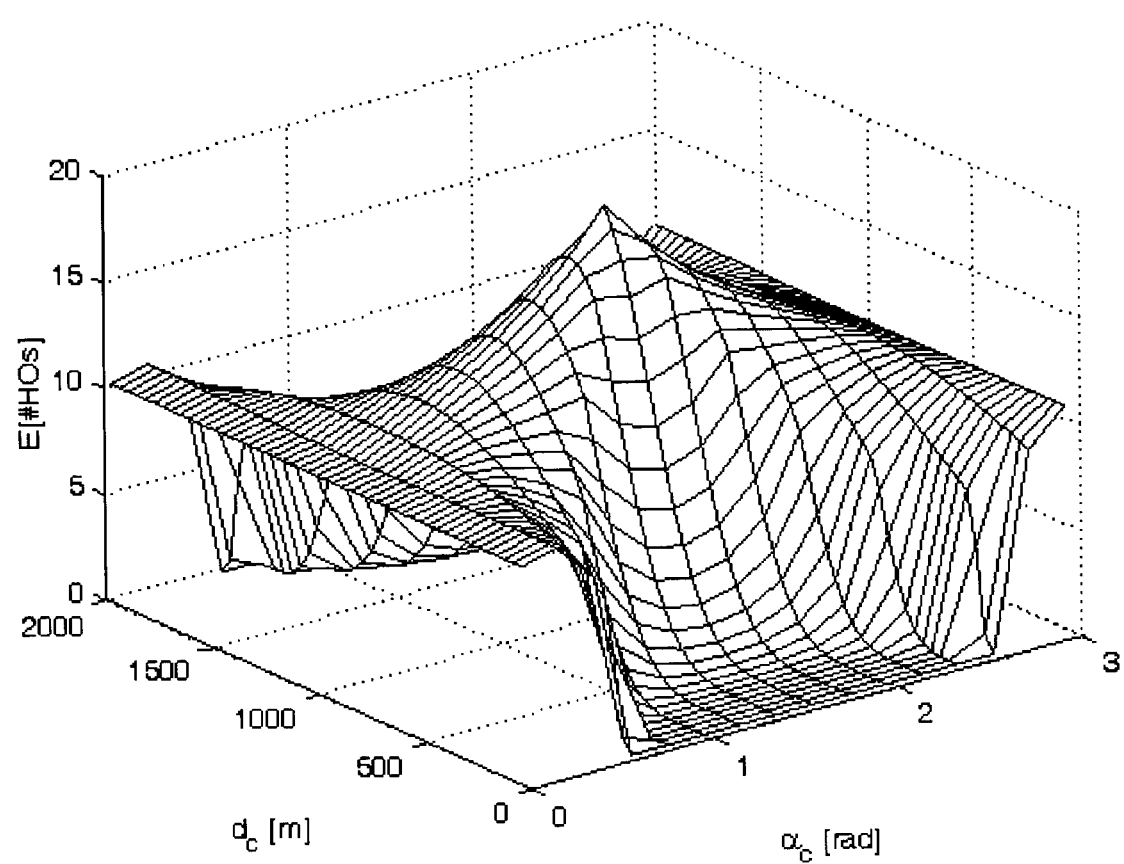
FIG. 23 shows mean number of handoffs, h=1.
Figure 24:
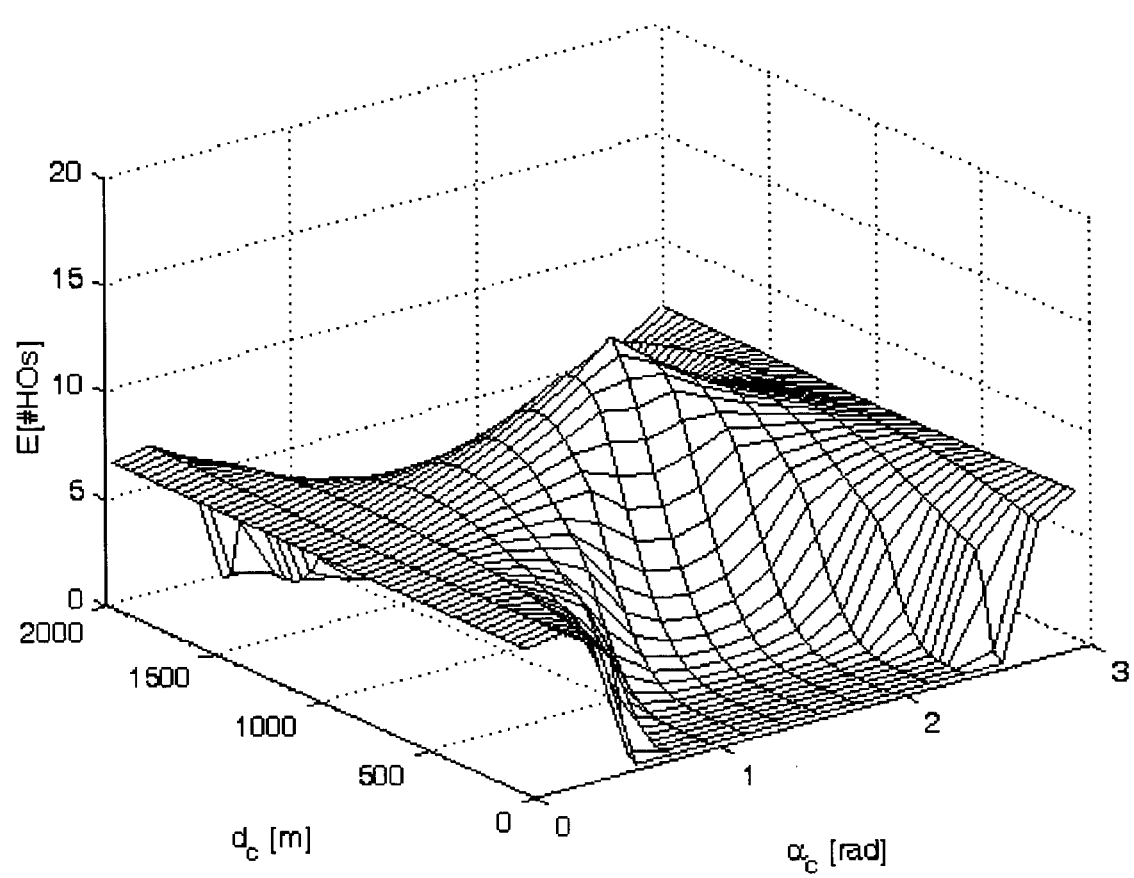
FIG. 24 shows mean number of handoffs, h=3.

FIGS. 23 and 24 show the mean number of handoffs obtained from this handoff model over the set of straight-line trajectories within a minimum geometric structure when the hysteresis parameter h is set to 1 and 3, respectively. For these figures, the set of segments was generated using (53) with $$(\delta_{d_c}, \delta_\alpha) = \left(100, \frac{\pi}{18}\right).$$

In FIGS. 23 and 24, the mean number of handoffs may achieve a maximum when $d_c$=1000 and $\alpha=\pi 2$, which corresponds to the trajectory $Tr_3$ along the cell boundary between $BS_i$ and $BS_j$. For this particular trajectory, the mean number of handoffs is about 12 when h=1 and about 6 when h=3. As h is increased, the entire surface becomes lower, though not in a uniform manner.

Each surface summarizes the handoff performance over the cellular network for a particular hysteresis value. As discussed earlier, an arbitrary trajectory in the network may be obtained by approximating the trajectory with a set of straight-line trajectories within a minimum geometric structure. The mean number of handoffs along the trajectory may then be obtained using surfaces such as those shown in FIGS. 23 and 24. These surfaces provide a convenient means for visualizing the overall signaling load due to handoffs in the network.

A main contribution of the present invention is a rigorous discrete-time framework for modeling and analyzing handoff performance in cellular networks. Based on the discrete-time framework, expressions may be derived for the probabilities of cell assignment and handoff along arbitrary straight-line trajectories. An efficient numerical procedure may then be developed for accurately evaluating the performance measures for handoff algorithms based on relative signal strength. By introducing the concept of a minimum geometric structure, a characterization of handoff performance over a wide range of possible mobile trajectories is developed. This invention finds direct application to the design and dimensioning of handoff algorithms in general and more specifically in hard handoff algorithms in cellular networks based on the GSM and GPRS standards.

In recent years, some novel handoff algorithms have been proposed in the research literature. For example, some algorithms formulate a locally optimal handoff algorithm to obtain the best tradeoff between expected number of service failures and expected number of handoffs. Other algorithms suggest the use of neural networks for handoff algorithms. Such algorithms may result in nonlinear assignment regions (cf. FIG. 4). In principle, nonlinear assignment regions are accommodated in the presently disclosed discrete-time framework, but the numerical evaluation of the assignment and handoff probabilities in this case may be computationally challenging. The same remark applies to handoff algorithms that use both relative and absolute signal strengths (cf. FIG. 3).

The numerical procedure developed for the present handoff mechanisms may be efficient for relatively small values of the hysteresis parameter h, but its complexity grows as $O(h^2)$. This complexity is due to the second-order Markov property of the processed signal strength $\{X[k]\}$. By contrast, the raw signal strength $\{Y[k]\}$ may be characterized as a first-order Markov chain. The higher order of the Markov chain $\{X[k]\}$ may be due to the averaging filter $f_{av}[k]$, which is used to eliminate fast fading. An alternative technique may be to eliminate fast fading while preserving the first-order Markov property of the raw signal strength. In this case, the handoff analysis may be performed more efficiently than with conventional averaging.

Although the present invention has been described illustratively in the case of hard handoff, the discrete-time handoff model may be extended to the case of soft handoff. For example, it is envisioned that the present invention may be applied to soft handoffs and the design of packet-switched CDMA networks that exploit macro-diversity.

Another illustrative embodiment of the invention which focuses specifically on soft handoff in IS-95 will be presented. This software handoff mechanism may be characterized by three basic parameters: an add threshold $T_a$, a drop threshold $T_d$, and a drop timer $\tau_d$. As the mobile unit moves in the network, it may sample received pilot signal strengths from base stations in its close vicinity, which may form a neighbor set, $N_k$, where k is the discrete-time sampling index. Among the base stations in $N_k$, some belong to the active set, $A_k$, and others to the candidate set, $C_k$. The candidate set is the set of neighbor base stations not in the active set with pilot signals of sufficient strength for the mobile unit to demodulate the associated forward traffic channels. A base station in the candidate set enters the active set if its pilot signal strength exceeds $T_a$. A base station currently in the active set leaves the active set if its pilot signal strength drops below $T_d$ for a period of time exceeding $\tau_d$.

A cell assignment model will now be discussed. The assignment of cell i to the mobile unit's active set may be determined by the time-evolution of the received signal strength process $Y_i(t)$. In IS-95 CDMA networks, cell i is preferably added to the mobile's active set when the value of $Y_i(t)$ exceeds the add threshold $T_a$. Cell i may then be removed from the active set when $Y_i(t)$ falls below the drop threshold $T_d$ for an interval of at least $\tau_d$ seconds. In the discrete-time framework, the cell assignment decision may be based on the process $Y_i[k]$. Cell i may be dropped from the active set when the value of $Y_i[k]$ is less than $T_d$ for M consecutive discrete-time instants, where $M=\lceil \tau_d/\tau_s \rceil$. The parameters $T_a$, $T_d$, and M may determine the soft handoff algorithm. In general, these parameters may also depend on the cell i.

An illustrative soft handoff embodiment of the present invention will now be discussed. A real line may be partitioned into three disjoint intervals defined as follows:

$$A=[T_a,\infty), H=(T_d,T_a), D=(-\infty,T_d], \quad (54)$$

where A is the assignment region, H is the hysteresis region, and D is the drop region. If $Y_i[k] \in A$, then cell i should be assigned to the active set at time k, i.e., $i \in A_k$. Let $Y_i[k\backslash r]$ denote the vector consisting of the r most recent values of $Y_i[k]$ up to and including time k:

$$Y_i[k\backslash r]=(Y_i[k-r+1], \ldots, Y_i[k]) \quad (55)$$

A soft handoff rule at time $k \geq 1$ may be expressed as follows: If cell i is not in the active set at time k−1, it may enter the active set at time k if and only if $Y_i[k] \in A$. Conversely, if cell i is not in the active set at time k−1, it may leave the active set at time k if and only if $Y_i[k\backslash M] \in D^M$. Cell i may be assumed not to be in the active set at time k=0.

It is convenient to characterize the received signal strength in terms of the regions A, H, and D. Specifically, the received signal $Y^i[k]$ may be mapped to a letter $S^i[k]$ defined on the alphabet $S=\{A,H,D\}$. Let $S^n$ denote the set of strings of length n over the alphabet S. The cardinality of $S^n$ is preferably $3^n$. Let $S^+$ denote the set of all finite length strings over the alphabet S, i.e., $S^+=\cup_{n=1}^{\infty} S^n$.

Let $E_i[k]$ denote the event that cell i is assigned to the active set at time k. The complementary event, $\overline{E}_i[k]$ should be the event that at time k cell i is not assigned to the active set. Then the cell non-assignment event, $\overline{E}_i[k]$, preferably occurs if and only if one of the following conditions holds:

$Y_i[k] \in A$ for $n=1,\ldots,k$, or $\quad$ (56)

$Y_i[n\backslash M] \in D_M$ for some $n, M \leq n \leq k$ and $Y_i[l] \in A$ for $n<l \leq k$. $\quad$ (57)

Let $B_k$ denote the set of strings of length k over the alphabet S that do not contain the character A. $B_k$ may be expressed as $B_k=\{H, D\}^k$. The first condition for cell non-assignment may be formulated in terms of the string $S_i[k\backslash k]$ as follows:

$$S_i[k\backslash k] \in B_k \quad (58)$$

Let $H_k$ denote the set of strings of length k that do not contain the sub-string $D^M$ or the character A. The set $H^k$ may be expressed as follows:

$$H_k=B_k \cup \{H,HD,HD^2,\ldots,HD^{M-1}\}^+ \quad (59)$$

The second condition for cell non-assignment may then be formulated as follows:

$$S_i[k\backslash r] \in D^M H^{r-M} \text{ for some } r, M \leq r \leq k. \quad (60)$$

The conditions (58) and (59) may be combined to express $\overline{E}_i[k]$ as a union of disjoint events:

$$\overline{E}_i[k] = \{S_i[k\backslash k] \in B_k\} \cup \bigcup_{r=M}^{k} \{S_i[k\backslash r] \in D^M H_{r-M}\} \quad (61)$$

For a string $s \in S^+$ of length $|s| \leq k$, the following notation may be introduced:

$$p_{k,i}(s)=P\{Y_i[k\backslash|s|] \in s\}. \quad (62)$$

Thus, $p_{k,i}(s)$ may represent the probability that the last $|s|$ values of the sequence $Y_i[k\backslash k]$ fall in the regions defined by the strings. The probability that cell i is assigned to the active set may be denoted by $P_i[k]=P\{E_i[k]\}$. Similarly, the probability that cell i is not assigned to the active set may be denoted by $\overline{P}_i[k]=P\{\overline{E}_i[k]\}$. Now, $P_i[k]+\overline{P}_i[k]=1$ for all $k \geq 0$.

The characterization of cell non-assignment in (61) may imply the following result.

Proposition 7:

$$\overline{P}_i[k] = \sum_{s \in B_k} p_{k,i}(s) + \sum_{r=M}^{k} \sum_{s \in D^M H_{r-M}} p_{k,i}(s) \quad (63)$$

Proposition 7 provides the basis for the numerical evaluation of the cell assignment probabilities. From the cell assignment probabilities, a number of handoff performance measures may be obtained. The outage probability is the probability that the active set is empty and may be given by:

$$P_o[k] = \prod_{i \in N_k} \overline{P}_i[k], \quad (64)$$

where $N_k$ is the set of neighbor cells. The mean size of the active set or macrodiversity degree may be given by:

$$\overline{N}_d = \frac{1}{K}\sum_{k=1}^{K} \sum_{i \in N_k} P_i[k]. \quad (65)$$

An efficient recursive procedure for evaluating the non-assignment probabilities given in Proposition 7 will now be presented. To that end, a family of M−1 sequences of functions may be defined as:

$$h_k^{[m]}:D \to \mathfrak{R}^+, k \geq 1, 1 \leq m \leq M-1, \quad (66)$$

where $\mathfrak{R}$ may denote the real line, as follows:

$$h_k^{[1]}(y) = \int_D f_{k-1}(z) f_k(y \mid z) dz, \quad (67)$$

$$h_{k-m}^{[m]}(y) = \int_D h_{k-m-1}^{[m-1]}(z) f_k(y \mid z) dz,$$

$$m = 2, \ldots, M - 1,$$

with the initialization condition:

$$h_k^{[m]}(y) = 0 \text{ for all } y \in D \text{ if } m < k. \quad (68)$$

Here, $f_k(x)$ may denote the marginal density of $Y[k]$ and $f_k(x|z)$ may denote the conditional density of $Y[k]$ given that $Y[k-1]=z$. These densities are preferably Gaussian. By further observing that $Y[k]$ is most likely a first-order Markov chain, one may show that:

$$p_k(D^M) = \int_D h_k^{[M-1]}(y) dy. \quad (69)$$

Next, we define a sequence of functions:

$$g_k: H \to \mathfrak{R}^+ \text{ and } g_k^{[m]}: D \to \mathfrak{R}^+, \quad (70)$$

for $m=1, \ldots, M-1$. For $k \geq 2$, $q_k: D \to \mathfrak{R}^+$ may be defined as follows:

$$q_k(y) = h_k^{[M-1]}(y) + \sum_{m=1}^{M-1} g_k^{[m]}(y). \quad (71)$$

Next, for $k \geq 1$ define:

$$q_k(y) = \int_D q_{k-1}(z) f_k(y|z) dz + g_k^{[1]}(y) \quad (72)$$

where $$q_k^{[1]}(y) = \int_D q_{k-1}(z) f_k(y|z) dz, \quad (73)$$

and $$q_k^{[r]}(y) = \int_H q_{k-1}^{[r-1]}(z) f_k(y|z) dz, \quad (74)$$

for $r=2, \ldots, M-1$. The initialization conditions may be:

$$q_0(y) = f_0(y) \text{ and } g_k^{[m]}(y) = 0 \text{ for } k < m. \quad (75)$$

With the above definitions, the cell non-assignment probabilities may be expressed as follows.
Proposition 8:

$$\overline{P}_i[k] = \int_D q_k(y) dy + \int_H g_k(y) dy \quad (76)$$

Proof: (Sketch) The proof is by induction on k. One shows that for each k, the right-hand-side of (76) is equivalent to the expression given in Proposition 7. In doing so, one uses the fact, noted earlier, that $Y[k]$ may be a first-order Markov chain.

Figure 25:
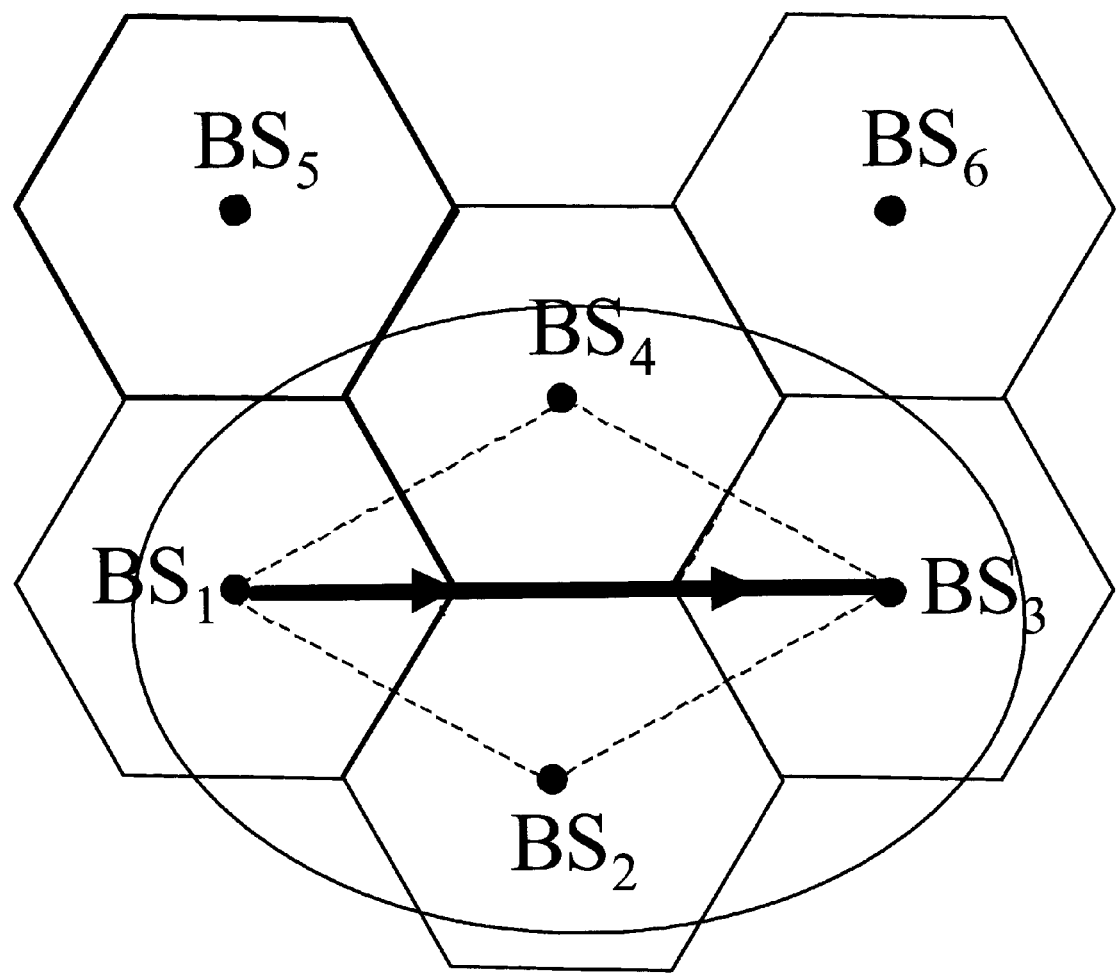
FIG. 25 shows a cellular network scenario for soft handoff.

FIG. 25 illustrates a possible cellular network and a mobile trajectory along the straight line directed from $BS_1$ to $BS_3$. In this example, the distance between two neighboring base stations is D=2000 m. The candidate set is C={1,2,3,4}. Cell assignment probabilities and the outage probabilities as functions of the discrete-time parameter k for a mobile unit traveling along trajectory in FIG. 1 may be calculated using the present invention. These analysis may be performed using an implementation of the recursive procedure of Proposition 8 in MATLAB.

Figure 26:
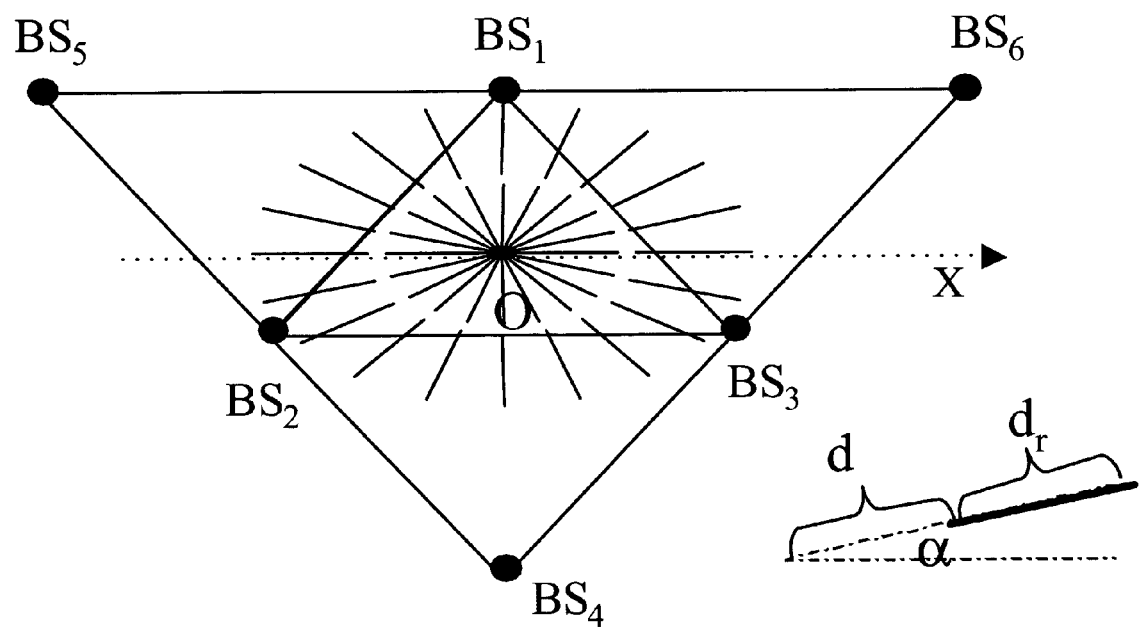
FIG. 26 shows a grid structure for soft handoff evaluation.

In order to study the mean macrodiversity degree for arbitrary trajectories in the cellular network, a family of straight-line segments directed from a fixed origin 0 may be considered as shown in illustrative FIG. 26. In this illustrative example, the segments all have length $d_r$. The starting point and orientation of each segment is specified by the pair $(d, \alpha)$, where d is the radial distance from the origin O and $\alpha$ is the angle of the segment with respect to the reference axis OX. Equivalently, the pair $(d, \alpha)$ may be expressed in Cartesian coordinates as $(d_X, d_Y)$, where $d_X = d \cos \alpha$ and $d_Y = d \sin \alpha$.

This illustration of a software handoff embodiment of the present invention shows a new discrete-time modeling and analysis technique to evaluate the performance of soft handoff analysis for mobile units traveling along an arbitrary trajectory in a cellular CDMA. An advantage of this embodiment is that it provides for a recursive computational procedure to evaluate the cell assignment probabilities efficiently and accurately. This analytical approach is advantageous to computer simulation both in accuracy and in efficiency, particularly in calculating outage probabilities. This invention may also be used to dimension and optimize soft handoff algorithms for CDMA networks. Numerical results for a cellular network with hexagonal cells show that the value of the drop timer parameter, $\tau_d$, may have a significant effect on the mean macrodiversity degree. It is envisioned that this soft handoff analysis system could be used to evaluate the achievable macrodiversity gain of cellular network architectures for a variety of indoor and outdoor propagation models.

Figure 27:
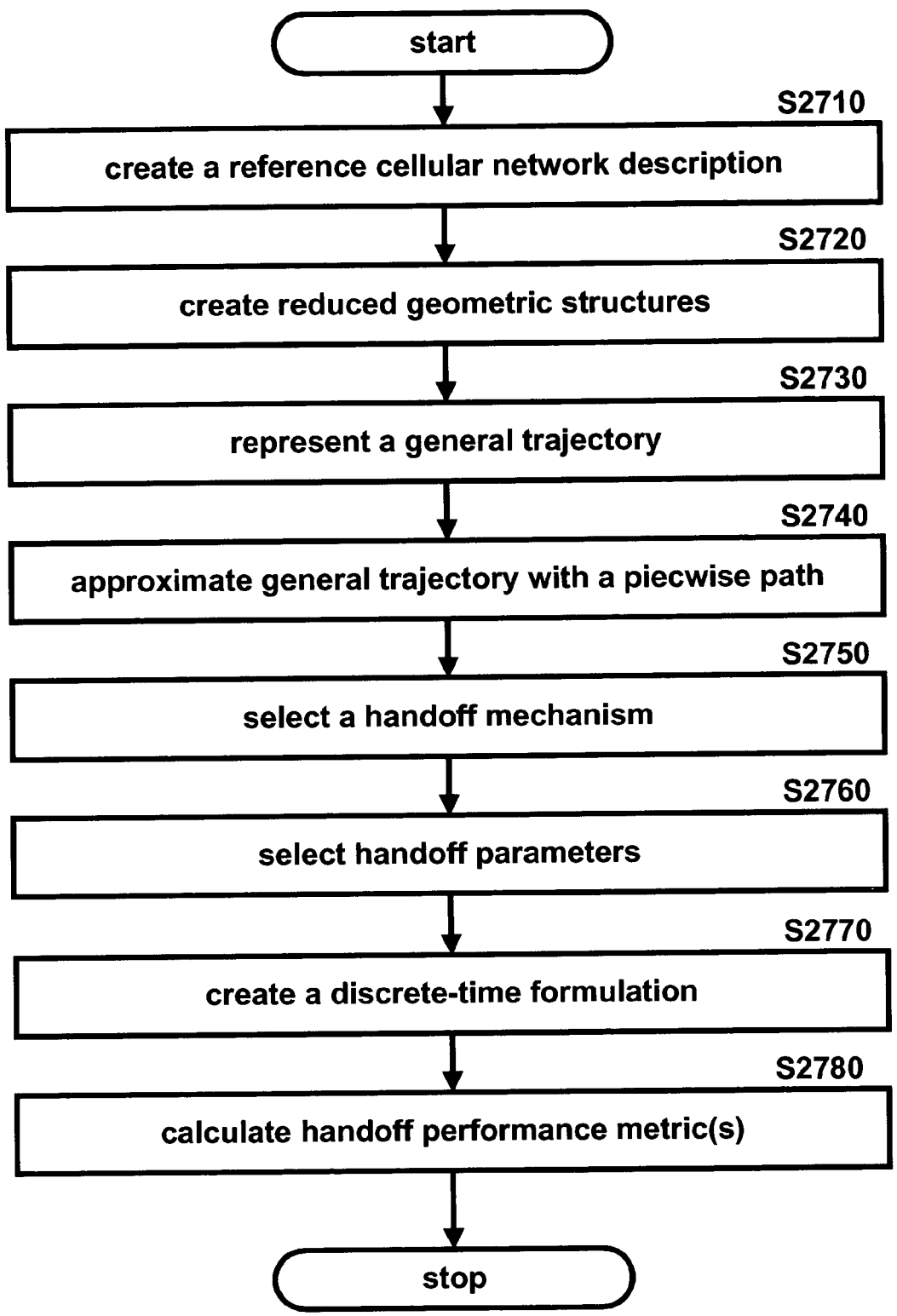
FIG. 27 shows a flow diagram of an embodiment of an aspect of the present invention.

FIG. 27 shows a flow diagram of an embodiment of an aspect of the present invention. This flow diagram represents basic steps that may be taken to practice an embodiment of the present invention. One skilled in the art will recognize that other sequences may be performed in accordance with the principals taught in this disclosure. At step S2710, a description on a cellular network may be created. This description should represent the network where handoff decision mechanisms are to be studied. A description as per this invention may include elements such as a cellular network geometry; a signal propagation description; a description of network base stations, and a description of network mobile units. The network base stations may be further described using elements such as the base stations location within said cellular network geometry and the base stations pilot signal strength. The mobile unit(s) preferably are capable of moving along a trajectory and sampling pilot signal strengths.

At step S2720, a reduced geometric structures may be created from the reference cellular network description. A representation of a general trajectory for a mobile unit traveling in the cellular network may be generated at step S2730. Next, at step S2740, a piecewise path may be approximated from the general trajectory representation. Next, a handoff mechanism may be selected at step S2750 and handoff parameters selected at step S2760. Examples of handoff mechanisms include hard handoff mechanisms and soft handoff mechanisms. Examples of handoff parameters include: hysteresis values; drop timer values; averaging parameters; and handoff decision intervals.

A discrete-time formulation may then be created at step 2770. This discrete-time formulation preferably characterizes handoff behaviors. Finally, handoff performance metric(s) may be calculated at step S2780. These metrics may include: an assignment probabilities; a handoff probabilities; mean number of handoff value(s); crossover point(s); outage probabilities; macrodiversity degrees; and overall signaling loads incurred by the handoff mechanism.

Figure 28:
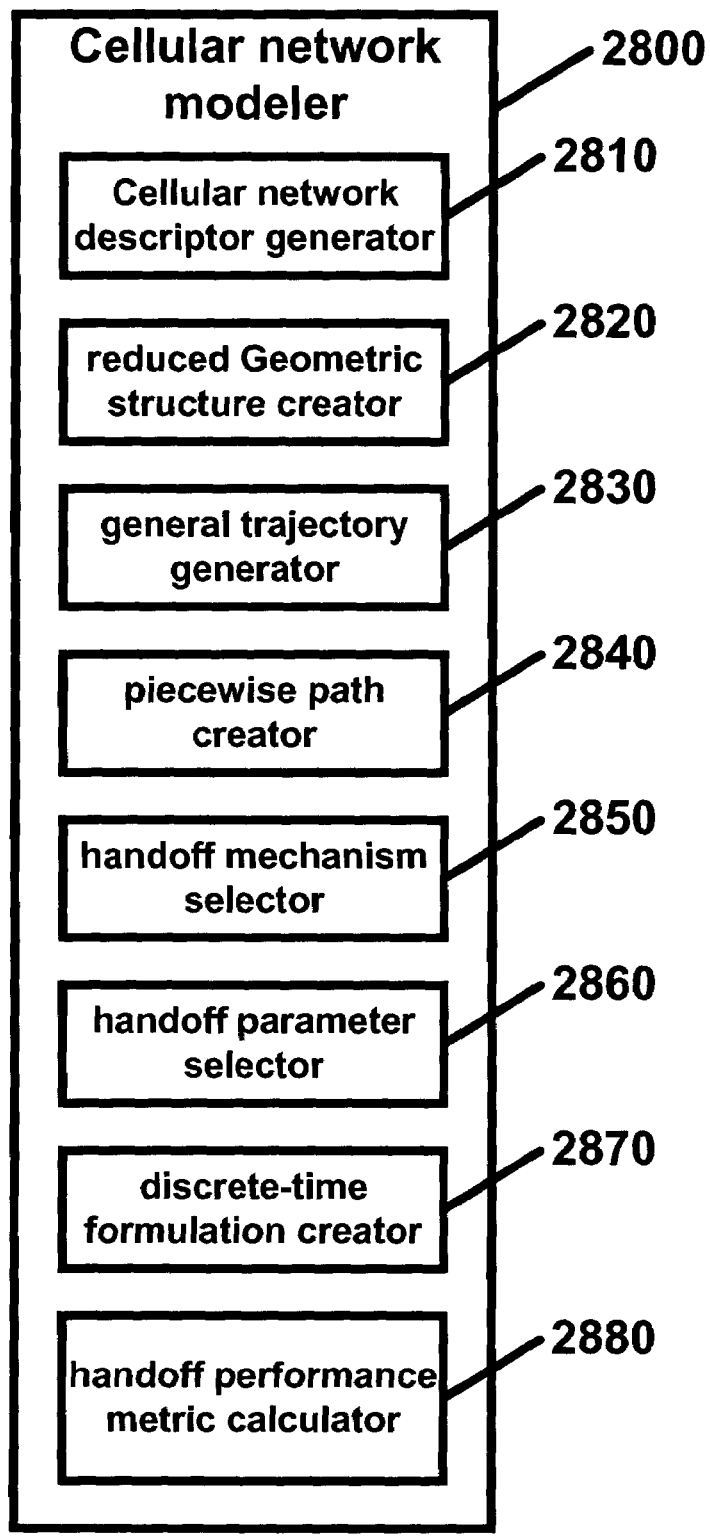
FIG. 28 shows a block diagram of an embodiment of an aspect of the present invention.

FIG. 28 shows a block diagram of an embodiment of an aspect of the present invention. This block diagram represents basic elements that may be used to practice an embodiment of the present invention. One skilled in the art will recognize that other elements may be used in accordance with the principals taught in this disclosure. The cellular network modeler 2800 preferably includes: a cellular network generator 2810; a reduced geometric structure creator 2820; a general trajectory generator 2830; a piecewise path creator 2840; a handoff mechanism selector 2850; a handoff parameter selector 2860; a discrete-time formulation creator 2870; and a handoff metric calculator 2880. The cellular network generator 2810 should be capable of generating a description of a reference cellular network to be studied as previously discussed. The reduced geometric structure creator 2820 is preferably capable of creating reduced geometric structures from a reference cellular network description. The general trajectory generator 2830 is preferably capable of representing a general trajectory for a mobile unit in a reference cellular network description. The piecewise path creator 2840 is preferably capable of approximating a general trajectory with a piecewise path having a multitude of handoff decision points. The handoff mechanism selector 2850 is preferably capable of selecting for analysis a handoff mechanism such as a hard handoff mechanism or a soft handoff mechanism. The handoff parameter selector 2860 is preferably capable of selecting for use in handoff analysis parameters such as hysteresis values; drop timer values; averaging parameters; and handoff decision intervals. The discrete-time formulation creator 2870 is preferably capable of creating a discrete-time formulation such as previously described. And finally, the handoff metric calculator 2880 is preferably capable of calculating performance handoff metrics such as: assignment probabilities; handoff probabilities; mean number of handoff value(s); crossover point(s); outage probabilities; macrodiversity degrees; and overall signaling loads incurred by the handoff mechanism.

It is envisioned that each of these elements may be implemented using digital hardware with or without microprocessor assistance. In one embodiment, the elements may all be modules operating within a single computer. However, to speed up results, the modules may be split into separate computers that are networked. For certain modules, it will likely be advantageous to implement their functions using signal processing.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated.

What is claimed is:

1. A method for evaluating the performance of cellular network handoff decisions comprising the steps of:
    a) creating a reference cellular network description, said reference cellular network description describing:
        i) a cellular network geometry;
        ii) a signal propagation description;
        iii) at least two base stations, each of said at least two base stations having:
            (1) a location within said cellular network geometry; and
            (2) a pilot signal having a pilot signal strength; and
        iv) at least one mobile unit capable of:
            (1) moving along a trajectory; and
            (2) sampling said pilot signal strength; and
    b) creating reduced geometric structures from said reference cellular network description;
    c) representing a general trajectory for said mobile unit in said reference cellular network description;
    d) approximating said general trajectory with a piecewise path having a multitude of handoff decision points;
    e) selecting a handoff mechanism;
    f) selecting handoff parameters;
    g) creating a discrete-time formulation characterizing handoff behaviors; and
    h) calculating at least one handoff performance metric along at least one said handoff decision point.

2. A method according to claim 1, wherein at least one of said at least one handoff performance metric includes:
    a) an assignment probability;
    b) a handoff probability;
    c) a mean number of handoff value;
    d) a crossover point;
    e) an outage probability;
    f) a macrodiversity degree; and
    g) an overall signaling load incurred by said handoff mechanism.

3. A method according to claim 1, wherein said cellular network geometry includes at least one of the following:
    a) a hexagonal cell pattern;
    b) a diamond cell pattern;
    c) a square cell pattern;
    d) a rhombus cell pattern; and
    e) a star pattern.

4. A method according to claim 1, wherein said cellular network geometry includes cells mapped into at least one reduced geometric structure.

5. A method according to claim 4, wherein said cellular network geometry includes reduced geometric structures mapped into at least one minimum geometric structure.

6. A method according to claim 1, wherein said signal propagation description includes at least one of the following components:
    a) a path loss component;
    b) a shadow fading component; and
    c) a fast fading component.

7. A method according to claim 1, wherein said piecewise path is a piecewise linear path.

8. A method according to claim 1, wherein said step of selecting a handoff mechanism includes selecting a hard handoff mechanism.

9. A method according to claim 1, wherein said step of selecting a handoff mechanism includes selecting a soft handoff mechanism.

10. A method according to claim 1, wherein said step of selecting a handoff mechanism considers at least one of the following:
    a) assignment regions;
    b) relative pilot signal strengths; and
    c) relative processed signal strengths.

11. A method according to claim 1, wherein said handoff parameters include at least one of the following:
    a) a hysteresis value;
    b) a drop timer value;
    c) an averaging parameter; and
    d) a handoff decision interval.

12. A method according to claim 1, wherein said step of calculating at least one handoff performance metric along at least one said handoff decision point uses a recursive procedure.

13. A cellular network handoff modeler comprising:
a) a reference cellular network description generator, capable of generating a reference cellular network description, said reference cellular network description describing:
   i) a cellular network geometry;
   ii) a signal propagation description;
   iii) at least two base stations, each of said at least two base stations having:
      (1) a location within said cellular network geometry; and
      (2) a pilot signal having a pilot signal strength; and
   iv) at least one mobile unit capable of:
      (1) moving along a trajectory; and
      (2) sampling said pilot signal strength; and
b) a reduced geometric structure creator, capable of creating reduced geometric structures from said reference cellular network description;
c) a general trajectory generator, capable of representing a general trajectory for said mobile unit in said reference cellular network description;
d) a piecewise path creator capable of approximating said general trajectory with a piecewise path having a multitude of handoff decision points;
e) a handoff mechanism selector;
f) handoff parameters selector;
g) a discrete-time formulation creator capable of characterizing handoff behaviors; and
h) a handoff performance metric calculator capable of calculating at least one handoff performance metric along at least one said handoff decision point.

14. A method according to claim 13, wherein at least one of said at least one handoff performance metric includes:
a) an assignment probability;
b) a handoff probability;
c) a mean number of handoff value;
d) a crossover point;
e) an outage probability;
f) a macrodiversity degree; and
g) an overall signaling load incurred by said handoff mechanism.

15. A method according to claim 13, wherein said cellular network geometry includes at least one of the following:
a) a hexagonal cell pattern;
b) a diamond cell pattern;
c) a square cell pattern;
d) a rhombus cell pattern; and
e) a star pattern.

16. A method according to claim 13, wherein said cellular network geometry includes cells mapped into at least one reduced geometric structure.

17. A method according to claim 16, wherein said cellular network geometry includes reduced geometric structures mapped into at least one minimum geometric structure.

18. A method according to claim 13, wherein said signal propagation description includes at least one of the following components:
a) a path loss component;
b) a shadow fading component; and
c) a fast fading component.

19. A method according to claim 13, wherein said piecewise path is a piecewise linear path.

20. A method according to claim 13, wherein said handoff mechanism selector is capable of selecting a hard handoff mechanism.

21. A method according to claim 13, wherein said handoff mechanism selector is capable of selecting a soft handoff mechanism.

22. A method according to claim 13, wherein said handoff mechanism selector considers at least one of the following:
a) assignment regions;
b) relative pilot signal strengths; and
c) relative processed signal strengths.

23. A method according to claim 13, wherein said handoff parameters include at least one of the following:
a) a hysteresis value;
b) a drop timer value;
c) an averaging parameter; and
d) a handoff decision interval.

24. A method according to claim 13, wherein said handoff performance metric calculator uses a recursive procedure.

* * * * *